US008854724B2

(12) United States Patent
El-Ghoroury et al.

(10) Patent No.: US 8,854,724 B2
(45) Date of Patent: Oct. 7, 2014

(54) SPATIO-TEMPORAL DIRECTIONAL LIGHT MODULATOR

(75) Inventors: Hussein S. El-Ghoroury, Carlsbad, CA (US); Zahir Y. Alpaslan, Carlsbad, CA (US); Jingbo Cai, Vista, CA (US); Marty Maiers, Fallbrook, CA (US); Philip Warner, San Marcos, CA (US); Dale A. McNeill, Encinitas, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 13/546,858

(22) Filed: Jul. 11, 2012

(65) Prior Publication Data

US 2013/0258451 A1 Oct. 3, 2013

Related U.S. Application Data

(60) Provisional application No. 61/616,249, filed on Mar. 27, 2012.

(51) Int. Cl.
*G02B 26/08* (2006.01)
*G02B 27/10* (2006.01)

(52) U.S. Cl.
USPC .......................................... 359/298; 359/619

(58) Field of Classification Search
USPC ................. 359/290–295, 298, 619
See application file for complete search history.

(56) References Cited

U.S. PATENT DOCUMENTS

| | | | |
|---|---|---|---|
| 5,059,008 A | 10/1991 | Flood et al. | |
| 5,691,836 A | 11/1997 | Clark | |
| 5,986,811 A | 11/1999 | Wohlstadter | |
| 6,137,535 A | 10/2000 | Meyers | |
| 6,151,167 A | 11/2000 | Melville | |
| 6,433,907 B1 | 8/2002 | Lippert et al. | |
| 6,795,221 B1 | 9/2004 | Urey | |
| 6,795,241 B1 | 9/2004 | Holzbach | |
| 6,803,561 B2 | 10/2004 | Dunfield | |
| 6,924,476 B2 | 8/2005 | Wine et al. | |

(Continued)

FOREIGN PATENT DOCUMENTS

| | | |
|---|---|---|
| EP | 2190019 | 5/2010 |
| EP | 2398235 | 12/2011 |

(Continued)

OTHER PUBLICATIONS

"International Search Report and Written Opinion of the International Searching Authority Dated Mar. 19, 2013, International Application No. PCT/US2012/068029".

(Continued)

*Primary Examiner* — Mohammed Hasan
(74) *Attorney, Agent, or Firm* — Blakely Sokoloff Taylor & Zafman LLP

(57) ABSTRACT

A spatio-temporal directional light modulator is introduced. This directional light modulator can be used to create 3D displays, ultra-high resolution 2D displays or 2D/3D switchable displays with extended viewing angle. The spatio-temporal aspects of this novel light modulator allow it to modulate the intensity, color and direction of the light it emits within an wide viewing angle. The inherently fast modulation and wide angular coverage capabilities of this directional light modulator increase the achievable viewing angle, and directional resolution making the 3D images created by the display be more realistic or alternatively the 2D images created by the display having ultra high resolution.

62 Claims, 11 Drawing Sheets

(56) References Cited

U.S. PATENT DOCUMENTS

| | | |
|---|---|---|
| 6,937,221 B2 | 8/2005 | Lippert et al. |
| 6,999,238 B2 | 2/2006 | Glebov et al. |
| 7,009,652 B1 | 3/2006 | Tanida et al. |
| 7,061,450 B2 | 6/2006 | Bright et al. |
| 7,071,594 B1 | 7/2006 | Yan et al. |
| 7,106,519 B2 | 9/2006 | Aizenberg et al. |
| 7,190,329 B2 | 3/2007 | Lewis et al. |
| 7,193,758 B2 | 3/2007 | Wiklof et al. |
| 7,209,271 B2 | 4/2007 | Lewis et al. |
| 7,215,475 B2 | 5/2007 | Woodgate et al. |
| 7,232,071 B2 | 6/2007 | Lewis et al. |
| 7,286,143 B2 | 10/2007 | Kang et al. |
| 7,292,257 B2 | 11/2007 | Kang et al. |
| 7,324,687 B2 | 1/2008 | Zitnick, III et al. |
| 7,369,321 B1 | 5/2008 | Ren et al. |
| 7,379,583 B2 | 5/2008 | Zitnick, III et al. |
| 7,400,439 B2 * | 7/2008 | Holman .................. 359/298 |
| 7,482,730 B2 | 1/2009 | Davis et al. |
| 7,486,255 B2 | 2/2009 | Brown et al. |
| 7,561,620 B2 | 7/2009 | Winder et al. |
| 7,580,007 B2 | 8/2009 | Brown et al. |
| 7,609,906 B2 | 10/2009 | Matusik et al. |
| 7,619,807 B2 | 11/2009 | Baek et al. |
| 7,620,309 B2 | 11/2009 | Georgiev |
| 7,623,560 B2 | 11/2009 | El-Ghoroury et al. |
| 7,630,118 B2 | 12/2009 | Onvlee |
| 7,639,293 B2 | 12/2009 | Narabu |
| 7,656,428 B2 | 2/2010 | Trutna, Jr. |
| 7,671,893 B2 | 3/2010 | Li et al. |
| 7,702,016 B2 | 4/2010 | Winder et al. |
| 7,703,924 B2 | 4/2010 | Nayar |
| 7,724,210 B2 | 5/2010 | Sprague et al. |
| 7,732,744 B2 | 6/2010 | Utagawa |
| 7,767,479 B2 | 8/2010 | El-Ghoroury et al. |
| 7,780,364 B2 | 8/2010 | Raskar et al. |
| 7,791,810 B2 | 9/2010 | Powell |
| 7,792,423 B2 | 9/2010 | Raskar et al. |
| 7,829,902 B2 | 11/2010 | El-Ghoroury et al. |
| 7,841,726 B2 | 11/2010 | Conner |
| 7,872,796 B2 | 1/2011 | Georgiev |
| 7,880,794 B2 | 2/2011 | Yamagata et al. |
| 7,897,910 B2 | 3/2011 | Roichman et al. |
| 7,916,934 B2 | 3/2011 | Vetro et al. |
| 7,936,392 B2 | 5/2011 | Ng et al. |
| 7,949,252 B1 | 5/2011 | Georgiev |
| 7,952,809 B2 | 5/2011 | Takai |
| 7,956,924 B2 | 6/2011 | Georgiev |
| 7,962,033 B2 | 6/2011 | Georgiev |
| 7,965,936 B2 | 6/2011 | Raskar et al. |
| 8,009,358 B2 | 8/2011 | Zalevsky et al. |
| 8,019,215 B2 | 9/2011 | Georgiev et al. |
| 8,049,231 B2 | 11/2011 | El-Ghoroury et al. |
| 8,106,994 B2 | 1/2012 | Ichimura |
| 8,126,323 B2 | 2/2012 | Georgiev et al. |
| 2006/0098285 A1* | 5/2006 | Woodgate et al. ............ 359/495 |
| 2006/0221209 A1 | 10/2006 | McGuire et al. |
| 2007/0109813 A1 | 5/2007 | Copeland et al. |
| 2008/0117491 A1* | 5/2008 | Robinson .................. 359/237 |
| 2009/0086170 A1 | 4/2009 | El-Ghoroury et al. |
| 2009/0278998 A1 | 11/2009 | El-Ghoroury et al. |
| 2010/0003777 A1 | 1/2010 | El-Ghoroury et al. |
| 2010/0026852 A1 | 2/2010 | Ng et al. |
| 2010/0026960 A1 | 2/2010 | Sprague |
| 2010/0066921 A1 | 3/2010 | El-Ghoroury et al. |
| 2010/0085468 A1 | 4/2010 | Park et al. |
| 2010/0091050 A1 | 4/2010 | El-Ghoroury et al. |
| 2010/0220042 A1 | 9/2010 | El-Ghoroury et al. |
| 2010/0245957 A1 | 9/2010 | Hudman et al. |
| 2010/0265386 A1 | 10/2010 | Raskar et al. |
| 2011/0096156 A1 | 4/2011 | Kim et al. |

FOREIGN PATENT DOCUMENTS

| | | |
|---|---|---|
| JP | 2008-304572 | 12/2008 |
| JP | 2010-117398 | 5/2010 |
| WO | WO-2005/048599 | 5/2005 |
| WO | WO-2007/092545 | 8/2007 |
| WO | WO-2011/065738 | 6/2011 |

OTHER PUBLICATIONS

Adelson, Edward H., et al., "Single Lens Stereo with a Plenoptic Camera", *IEEE Transactions on Pattern Analysis and Machine Intelligence*, vol. 14, No. 2, (Feb. 1992), pp. 99-106.

Bolles, Robert C., et al., "Epipolar-Plane Image Analysis: An Approach to Determining Structure from Motion", *International Journal of Computer Vision*, vol. 1, (1987), pp. 7-55.

Georgiev, Todor, et al., "Light Field Camera Design for Integral View Photography", *Adobe Technical Report*, (2003), pp. 1-13.

Nayar, Shree K., "Computational Cameras: Approaches, Benefits and Limits", *Columbia University Technical Report No. CUCS-001-11*, (Jan. 15, 2011), pp. 1-22.

Ng, Ren, "Digital Light Field Photography", *Stanford University Doctorial Thesis*, (Jul. 2006), 203 pp. total.

Ng, Ren, et al., "Light Field Photography with a Hand-held Plenoptic Camera", *Stanford University Tech Report CTSR 2005-02*, (2005), pp. 1-11.

Veeraraghavan, Ashok, et al., "Dappled Photography: Mask Enhanced Cameras for Heterodyned Light Fields and Coded Aperture Refocusing", *Mitsubishu Electric Research Laboratories (MERL) TR2007-115; ACM Transactions on Graphics*, vol. 26, No. 3, Article 69, (Jul. 2007), pp. 69-1-69-12, 14 pp. total.

"International Search Report and Written Opinion of the International Searching Authority Dated Sep. 18, 2013; International Application No. PCT/US2012/068028".

"Invitation to Pay Additional Fees, Partial Search Report Dated Jan. 25, 2013, International Application No. PCT/US2012/068028".

Office Action Dated Mar. 21, 2014; U.S. Appl. No. 13/329,107, (Mar. 21, 2014).

Notice of Allowance Dated Aug. 21, 2014; U.S. Appl. No. 13/329,107, (Aug. 21, 2014).

* cited by examiner

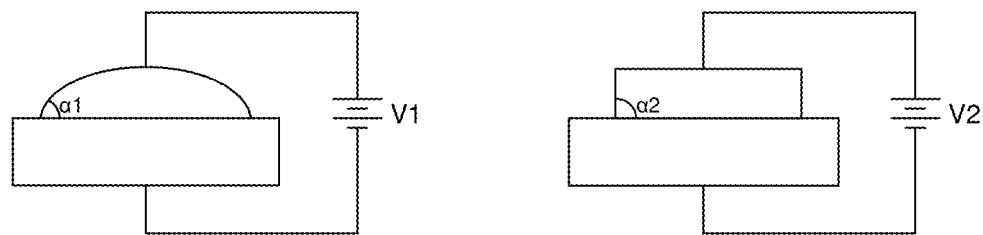
Fig. 1A: Prior Art
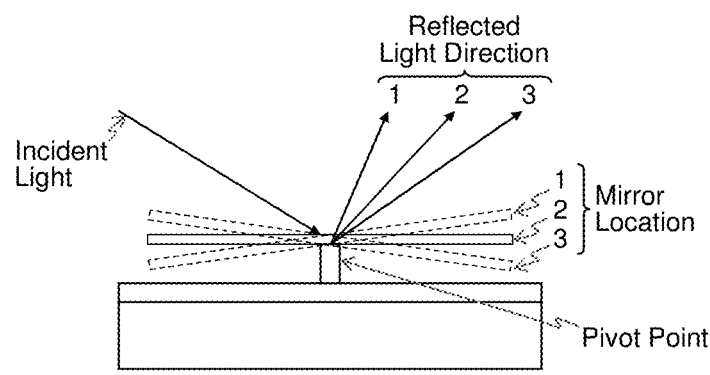
Fig. 1B: Prior Art
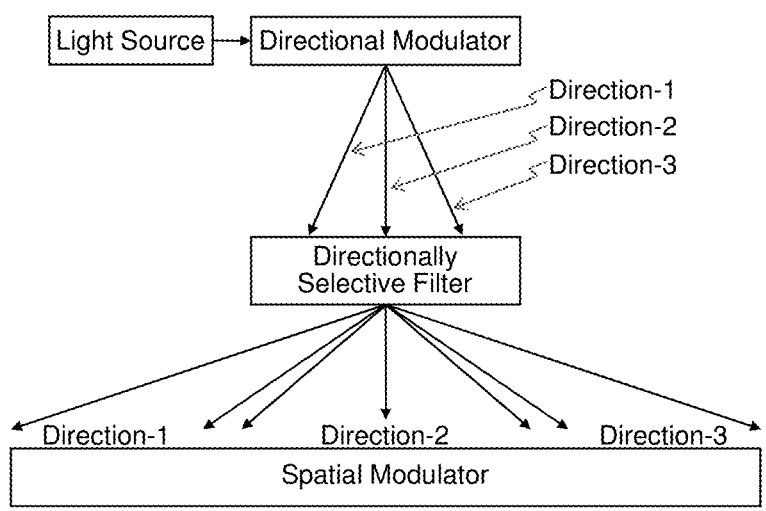
Fig. 1C: Prior Art

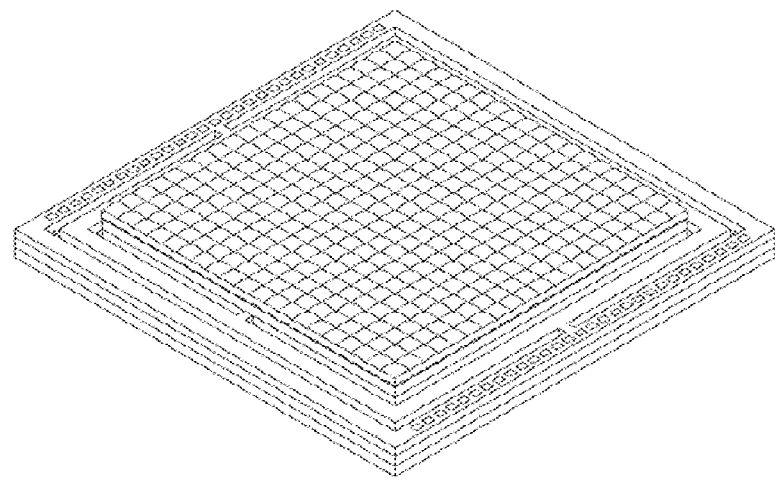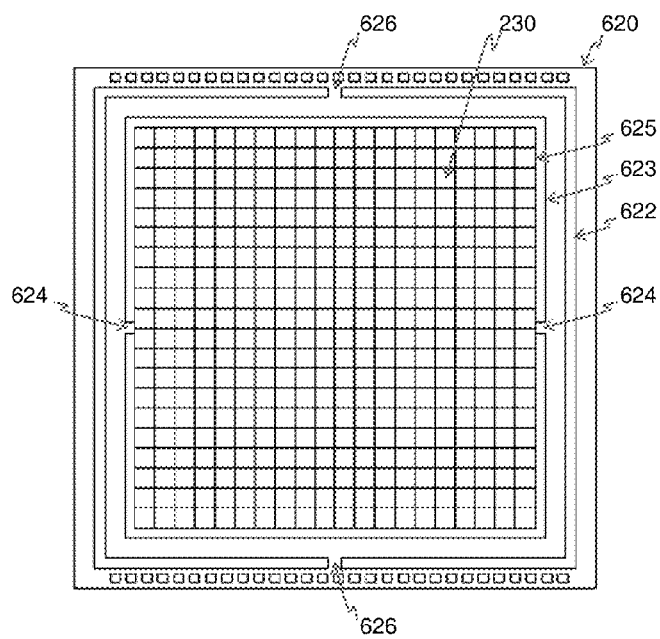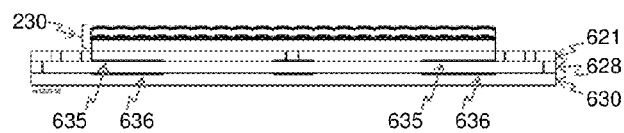
Fig. 6

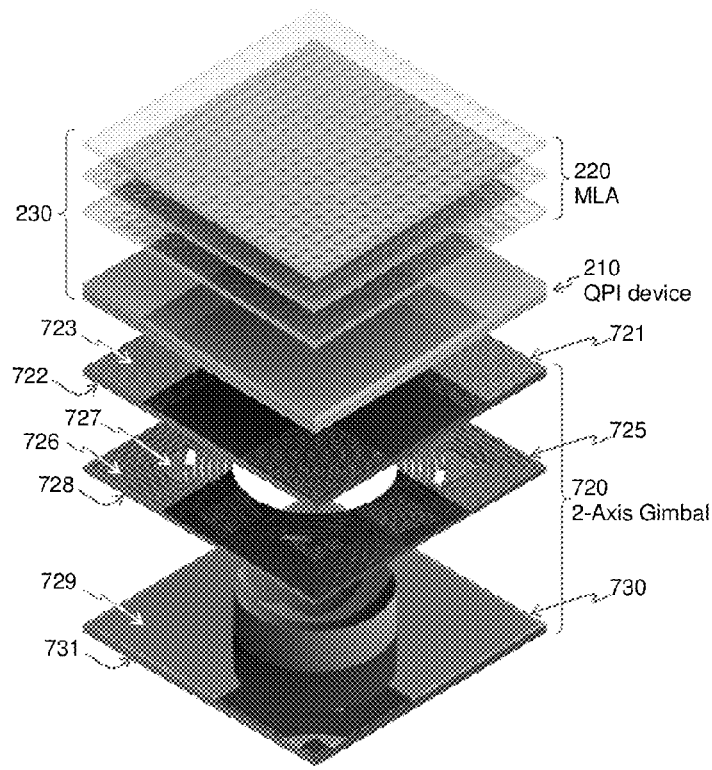
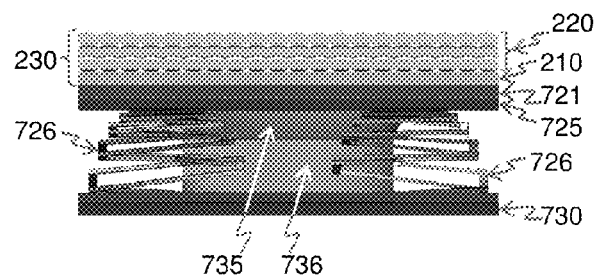
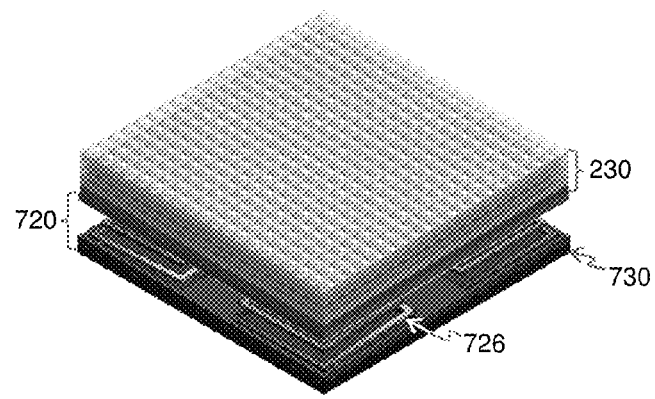
Fig. 7

SPATIO-TEMPORAL DIRECTIONAL LIGHT MODULATOR

CROSS-REFERENCE TO RELATED APPLICATIONS

This application claims the benefit of U.S. Provisional Patent Application No. 61/616,249 filed Mar. 27, 2012.

BACKGROUND OF THE INVENTION

1. Field of the Invention

The present invention relates to the field of directional light modulation, 3D displays, emissive micro displays, 2D/3D switchable displays.

2. Prior Art

In 3D displays, directional modulation of the emitted light is necessary to create the 3D viewing perception. In a typical 3D display, a backlight with uniform illumination in multiple illumination directions is required to display images of the same scene from different directions by utilizing some combination of spatial multiplexing and temporal multiplexing in the spatial light modulator. In these 3D displays the light that typically comes from the directional backlight is usually processed by a directionally selective filter (such as diffractive plate or a holographic optical plate for example) before it reaches the spatial light modulator pixels that modulate the light color and intensity while keeping its directionality.

Currently available directional light modulators are a combination of an illumination unit comprising multiple light sources and a directional modulation unit that directs the light emitted from the light sources to a designated direction (see FIGS. 1A, 1B & 1C). As illustrated in FIGS. 1A, 1B & 1C which depict several variants of the prior art, an illumination unit is usually combined with an electro-mechanical movement device such as scanning mirrors or rotating barriers (see U.S. Pat. Nos. 6,151,167, 6,433,907, 6,795,221, 6,803,561, 6,924,476, 6,937,221, 7,061,450, 7,071,594, 7,190,329, 7,193,758, 7,209,271, 7,232,071, 7,482,730, 7,486,255, 7,580,007, 7,724,210 and 7,791,810, and U.S. Patent Application Publication Nos. 2010/0026960 and 2010/0245957, or electro-optically such as liquid lenses or polarization switching (see FIGS. 1A, 1B & 1C and U.S. Pat. Nos. 5,986,811, 6,999,238, 7,106,519, 7,215,475, 7,369,321, 7,619,807 and 7,952,809).

In both electro-mechanically and electro-optically modulated directional light modulators there are three main drawbacks:

1. Response time: The mechanical movement or optical surface change are typically not achieved instantaneously and affect the modulator response time. In addition, the speed of these operations usually takes up some portion of the image frame time that reduces the achievable display brightness.

2. Volumetric aspects: These methods need a distance between the light source and directional modulation device to work with, which increases the total volume of the display.

3. Light loss: Coupling light on to a moving mirror creates light losses which in turn degrades the display system power efficiency and creates heat that has to be eliminated by incorporating bulky cooling methods that add more volume and increased power consumption.

In addition to being slow, bulky and optically lossy, the prior art directional backlight units need to have narrow spectral bandwidth, high collimation and individual controllability for being combined with a directionally selective filter for 3D display purposes. Achieving narrow spectral bandwidth and high collimation requires device level innovations and optical light conditioning, increasing the cost and the volumetric aspects of the overall display system. Achieving individual controllability requires additional circuitry and multiple light sources increasing the system complexity, bulk and cost. U.S. patent application Ser. No. 13/329,107 introduced a novel spatio-optical directional light modulator that overcomes most all of these drawbacks, however its angular coverage is limited by the numerical aperture of its light collimation optics.

It is therefore an objective of this invention to introduce an extended angular coverage spatio-temporal light modulator that overcomes the limitation of the prior art, thus making it feasible to create 3D and high resolution 2D displays that provide the volumetric advantages plus a viewing experience over a wide viewing angle. Additional objectives and advantages of this invention will become apparent from the following detailed description of a preferred embodiment thereof that proceeds with reference to the accompanying drawings.

BRIEF DESCRIPTION OF THE DRAWINGS

FIG. 1A illustrates prior art directional light modulator that uses liquid lens.

FIG. 1B illustrates prior art directional light modulator that uses scanning mirrors.

FIG. 1C illustrates prior art prior directionally modulated 3D light modulator.

FIG. 6 illustrates isometric, side and top views of one embodiment of the spatio-temporal directional light modulator of this invention.

FIG. 7 illustrates isometric, side and top views of another embodiment of the spatio-temporal directional light modulator of this invention.

DETAILED DESCRIPTION OF THE PREFERRED EMBODIMENTS

Figure 2:
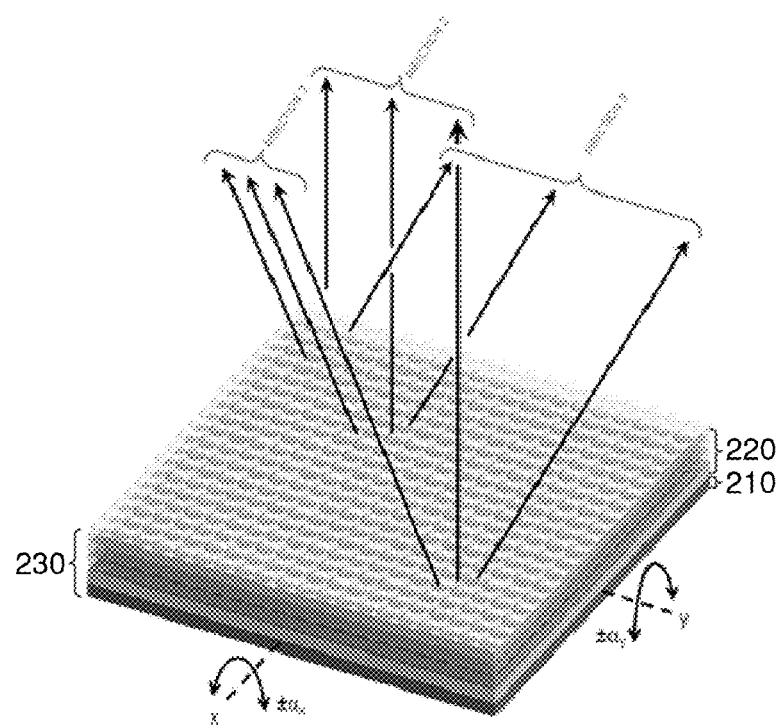
FIG. 2 illustrates an isometric view of the principle aspects of the spatio-temporal directional light modulator of this invention.

References in the following detailed description of the present invention to "one embodiment" or "an embodiment" means that a particular feature, structure, or characteristics described in connection with the embodiment is included in at least one embodiment of the invention. The appearances of the phrase "in one embodiment" in various places in this detailed description are not necessarily all referring to the same embodiment.

A new class of emissive micro-scale pixel array devices has been recently introduced These devices feature high brightness, very fast light multi-color intensity and spatial modulation capabilities in a very small single device size that includes all the drive circuitry. The SSL light emitting pixels of one such a device may be either a light emitting diode (LED) or laser diode (LD) whose on-off state is controlled by the drive circuitry contained within a CMOS chip (or device) upon which the emissive micro-scale pixel array is bonded. The size of the pixels comprising the emissive array of such devices would typically be in the range of approximately 5-20 micron with the typical emissive surface area of the device being in the range of approximately 15-150 square millimeter. The pixels within the emissive micro-scale pixel array device are individually addressable spatially, chromatically and temporally, typically through the drive circuitry of its CMOS chip. One example of such devices are the QPI devices (see U.S. Pat. Nos. 7,623,560, 7,767,479, 7,829,902, 8,049,231, and 8,098,265, and U.S. Patent Application Publication Nos. 2010/0066921, 2012/0033113), referred to in the exemplary embodiments described below. Another example of such device is an OLED based micro-display. However it is to be understood that the QPI device is merely an example of the types of devices that may be used in the present invention. Thus in the description to follow, references to a QPI device are to be understood to be for purposes of specificity in the embodiments disclosed, and not for any limitation of the present invention.

The present invention combines the emissive micro pixel array capabilities of the QPI device with passive wafer level optics (WLO) and an articulated movement of the entire assembly to create a light modulator that can perform the functionalities of a directional light source and a diffractive plate of the prior art at the same time. As used herein, wafer level or wafer means a device or matrix of devices having a diameter of at least 2 inches, and more preferably 4 inches or more. WLO are fabricated monolithically on the wafer from a polymer using ultra violet (UV) imprint lithography. Among primary advantages of WLO are the ability to fabricate small feature micro lens arrays (MLA) and to be able to precisely align multiple WLO micro lens array layers together and with an optoelectronics device such as a CMOS sensor or the QPI. The alignment precision that can be achieved by a typical WLO fabrication technique can be less than one micron. The combination of the individual pixel addressability of the emissive micro emitter pixel array of the QPI and the WLO micro lens array (MLA) that can be precisely aligned with respect to the micro emitter array of the QPI eliminates the need experienced in prior art for having a directionally selective filter in the system while relaxing the requirement for the narrow spectral bandwidth in the light source, reducing the system volume, complexity and cost simultaneously. In this invention directional modulation of the emitted light is achieved by the combination of the light divergence achieved the WLO and the articulated movement of the entire assembly.

FIG. 2 conceptually illustrates spatio-temporal directional light modulator of this invention. As illustrated in FIG. 2, the directional light modulator of this invention is comprised of an emissive micro array QPI device 210 with a WLO micro lens array (MLA) 220 mounted directly on top of its emissive surface with the entire assembly being temporally articulated around at least one axis, and preferably around both its x and y axes by angles within the range of $+\alpha_x$ and $+\alpha_y$; respectively. The articulation of the QPI/MLA assembly 230 as illustrated in FIG. 2 would be accomplished by placing the entire assembly on a 2-axis gimbal whereby the x-axis of the gimbal is temporally actuated by an angle within the range of $+\alpha_x$ and the y-axis of the gimbal is temporally actuated by an angle within the range of $\pm\alpha_y$. The x-axis and y-axis temporal articulation provided by the 2-axis gimbal will cause the directional modulation angle of the light emitted from QPI/MLA assembly 230 to be temporally extended by $2\alpha_x$ around the x direction and by $2\alpha_y$ around the y direction beyond the angular extent provided by the micro lens elements of the MLA 220 (see FIG. 3). As used herein, the words gimbal and two axis gimbal are used in the general sense, and mean any structure that will allow rotation, at least through a limited angle, about either or both any two orthogonal axes at any time. Thus concentric rings, ball joints and any other structure that will provide that capability are included within the definition.

Figure 3:
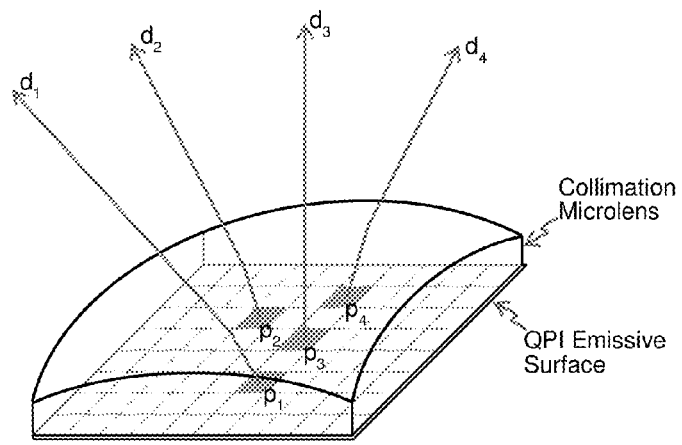
FIG. 3 illustrates the spatio-optical directional light modulation aspects of the spatio-temporal directional light modulator of this invention.

Referring to FIG. 3, associated with each of the micro lens elements 310 comprising the 2-dimensional micro lens array MLA 220 is the group of individually addressable QPI pixels $(p_1, p_2, \ldots, p_n)$ whereby the light emitted from each of the pixels in this group of pixels would be refracted into one of the unique directions $(d_1, d_2, \ldots, d_n)$ within the numerical aperture (angular extent) of their associated micro lens element. The entire micro-pixel array of the QPI device 210 would comprise a multiplicity of QPI pixel groups $(G_1, G_2, \ldots, G_N)$, herein also referred to as pixel modulation groups, whereby each modulation group $G_i$ would be associated with one of the 2-dimensional array MLA 220 lens elements and collectively the pixel modulation groups $(G_1, G_2, \ldots, G_N)$ would then represents the spatial modulation array of the spatio-temporal directional light modulator of this invention. With the temporal articulation illustrated in FIG. 2 and the one-to-one association of the individual pixels $(p_1, p_2, \ldots, p_n)$ within each pixel group and the emitted light directions $(d_1, d_2, \ldots, d_n)$, it becomes possible for the spatio-temporal directional light modulator of this invention conceptually illustrated in FIG. 2 to have associated with each of its pixel groups $G_i$ a multiplicity of temporally multiplexed directions $(d_{1i}, d_{2i}, \ldots, d_{mi})$; $i=1, 2, \ldots$, each being individually addressable by temporal addressing of the individual pixels $(p_1, p_2, \ldots, p_n)$ within each of the pixel groups $(G_1, G_2, \ldots, G_N)$. The multiplicity of QPI pixel groups $(G_1, G_2, \ldots, G_N)$ associated with the 2-dimensional array MLA 220 of FIG. 2 would then represent the spatial modulation array of the spatio-temporal directional light modulator of this invention with the temporally multiplexed directions $(d_{1i}, d_{2i}, \ldots, d_{mi})$; $i=1, 2, \ldots$, representing the multiplicity of light modulation directions individually addressable through temporal addressability of the pixels $(p_1, p_2, \ldots, p_n)$ of the QPI device 210 comprising each pixel modulation group. In other words, the spatio-temporal directional light modulator of this invention would be able to spatially modulate light through addressability of the QPI pixel groups ($G_1, G_2, \ldots, G_N$) and directionally modulate the light emitted from each pixel group in the directions ($d_{1i}, d_{2i}, \ldots, d_{ni}$); i=1, 2, . . . , through temporal addressability of the pixels ($p_1, p_2, \ldots, p_n$) comprising each group. Therefore, the spatio-temporal directional light modulator of this invention illustrated in FIG. 2 would be able to generate light that can be spatially and directionally modulated whereby the light emitted from each of the spatial locations that equals the emissive area of the QPI pixel groups ($G_1, G_2, \ldots, G_N$) is individually addressable through the addressability of the pixel groups as well as being directionally addressable through the temporal addressability of the individual pixel within each pixel group.

Figure 4A:
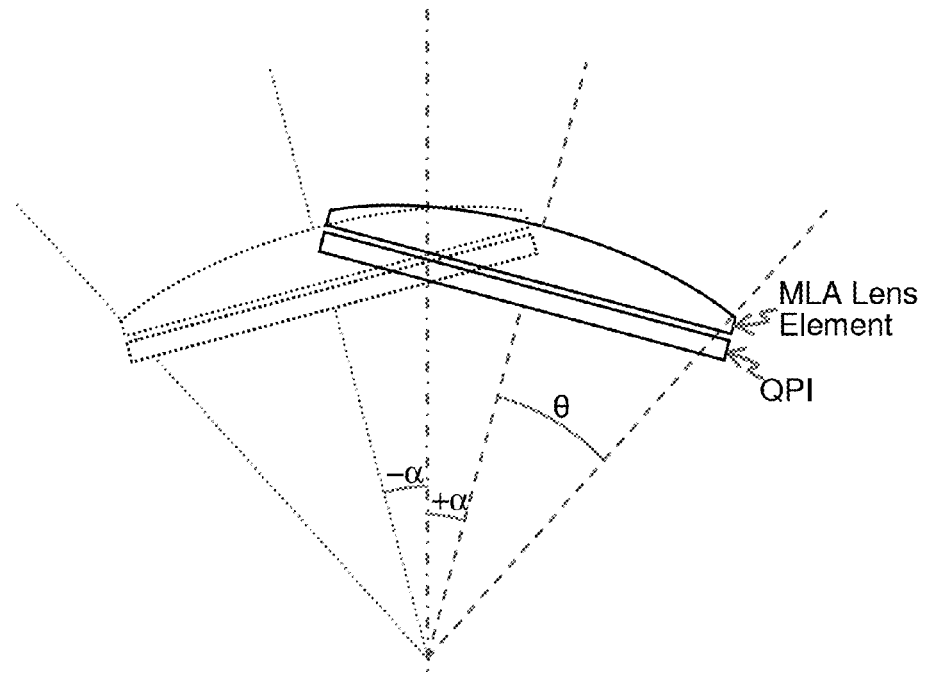
FIG. 4A illustrates the angular emission expansion made possible by the temporal articulation aspects of the spatio-temporal directional light modulator of this invention.

The x-axis and y-axis articulation of QPI/MLA assembly 230 as illustrated in FIG. 2 will cause the light emitted in the directions ($d_1, d_2, \ldots, d_n$) to be temporally multiplexed into the multiplicity of light directions ($d_{1i}, d_{2i}, \ldots, d_{ni}$); i=1, 2, . . . , which extend over the angular extent provided by the lens elements of the MLA 220 plus $2\alpha_x$ in the x direction and by $2\alpha_y$ in the y directions. This is illustrated in FIG. 4A which shows the temporal expansion of the QPI/MLA assembly 230 angular emission extent along one articulation axis, for the purpose of illustration. Referring to FIG. 4A, the angle Θ represents the angular extent of one lens element of the MLA 220 and the angle α represents the composite instantaneous articulation angle of the lens element as a result of the gimbal articulation by the angles $\alpha_x(t)$ and $\alpha_y(t)$ around the x-axis and the y-axis; respectively. The articulation of QPI/MLA assembly 230 as illustrated in FIG. 2 and explained by FIG. 4A enable the pixels within emissive micro-scale array of the QPI device 210, which are individually addressable through the QPI drive circuitry, to emit light that is modulated both spatially, chromatically and directionally whereby the angular extent of the directionally modulated light is temporally expanded by an angle $2\alpha_x$ in the x direction and by an angle $2\alpha_y$ in the y direction beyond the angular extent Θ (or numerical aperture) of the lens elements of the MLA 220. Furthermore, temporal articulation of the spatio-temporal directional light modulator 200 of this invention would temporally increase the modulated number of light directions ($d_1, d_2, \ldots, d_n$) by the ratio of the angular extent expansion in each articulation direction expressed as $(\Theta+\alpha_x)(\Theta+\alpha_y)/\Theta^2$.

Figure 4B:
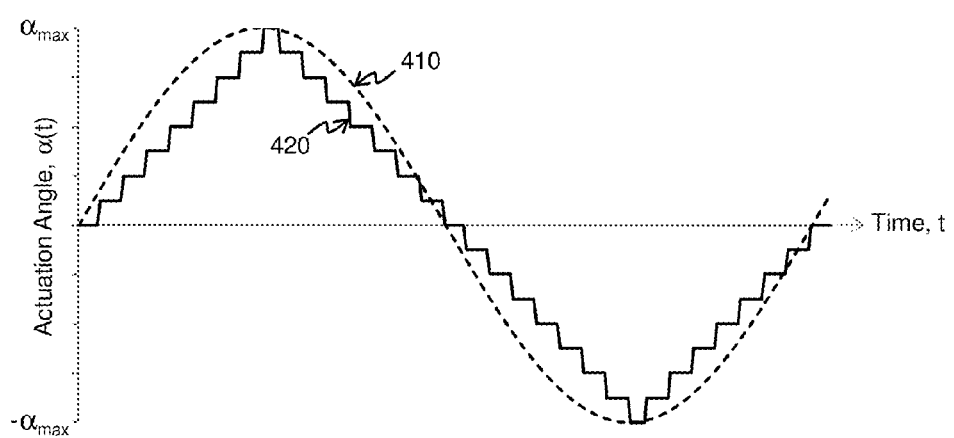
FIG. 4B illustrates the angular temporal articulation of the spatio-temporal directional light modulator of this invention.
Figure 5:
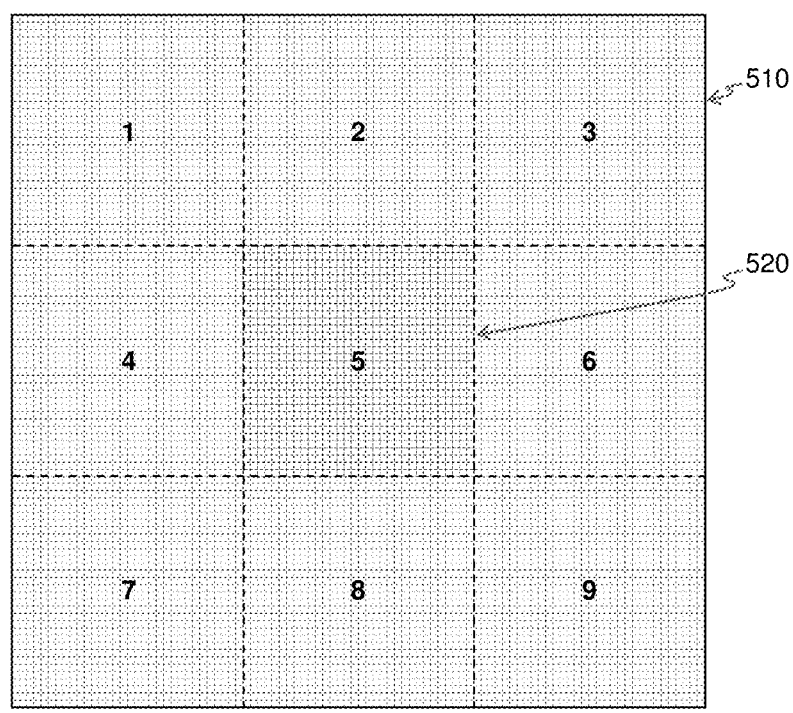
FIG. 5 illustrates the extended angular coverage cross section of the spatio-temporal directional light modulator of this invention.

The 2-axis articulation of the QPI/MLA assembly 230 of the spatio-temporal directional light modulator 200 of this invention can be in either temporally continuous or discrete (stepwise). FIG. 4B illustrates the composite temporal articulation angle α(t) of the QPI/MLA assembly 230 in one axis, for the purpose of illustration, when the articulation is temporally continuous 410 and when the actuation is temporally discrete 420. When the temporal articulation of the spatio-temporal directional light modulator 200 of this invention is discrete or stepwise (420), the typical angular step size would preferably be proportional to the ratio of the angular extent Θ of the MLA 220 to spatial resolution the QPI/MLA assembly 230. As illustrated in FIG. 5, the temporal articulation of the QPI/MLA assembly 230 of the spatio-temporal directional light modulator of this invention would typically be a repetitive (or periodic) and independent around each of the 2-axis. The repetition periods of the articulation of the spatio-temporal light modulator of this invention would typically be proportional to and synchronized with display input data frame duration (for the purpose of reference, the image input data to a typical display arrives at 60 frames per second and is often referred to as 60 Hz frame rate input). The maximum values $\pm\alpha_{xmax}$ of the temporal articulation illustrated in FIG. 5 would determine the expanded angular extent provided by the spatio-temporal light modulator which is determined by the value $\pm(\Theta+\alpha_{max})$, where the angle Θ represents the angular extent of the lens elements of the MLA 220. The periodicity of the x-axis and y-axis articulation collectively would typically be selected to enable temporal coverage of the desired expanded angular extent of the spatio-temporal light modulator 200 of this invention within a required display input frame rate.

FIG. 5 illustrates the angular coverage cross section 510 of the QPI/MLA assembly 230 of the spatio-temporal directional light modulator 200 of this invention being comprised of temporally multiplicity of the angular coverage cross section 520 of the MLA lens element. Appropriately selected temporal articulation $\alpha_x(t)$ and $\alpha_y(t)$ of the QPI/MLA assembly 230 around its x-axis and y-axis; respectively, will generate the angular coverage 510 that is comprised of multiplicity of temporally multiplexed angular coverage 520 of the MLA 210 lens element. Depending on the magnitude of the angular articulation $\alpha_x$ and $\alpha_y$ of the QPI/MLA assembly 230 around their x and y axes, the shape of the angular coverage cross section 510 can be tailored in aspect ratio. The articulation rate around the x and y directions would be sufficient to ensure that the temporally generated light directions within the angular coverage 510 have adequate duty cycle (modulation duration) within the modulation frame of the input image data. For example, when the modulation frame of the input image data is 60 image frames per second, which is typically referred to as 60 Hz image frame rate, each of the light directions within each of the temporal angular coverage 520 illustrated in FIG. 5 will need to be modulated once per frame, thus making the articulation rate required to generate angular coverage illustrated in FIG. 5 to be at least 180 Hz around either the x or the y axis. In other words, for the angular coverage example illustrated in FIG. 5 where the size of the temporal angular coverage 510 is three times the size of angular coverage 520 in each axis, the articulation rate around either the x or the y directions for the illustration of FIG. 5 would need to be at least three times the input image data frame rate. The angular coverage 520 of the MLA lens element can be either overlapping or non-overlapping. In general the articulation rate of the QPI/MLA assembly 230 around either the x or y axis will have to be at least equal to the modulation frame rate of the input image data multiplied by a factor that equals to ratio of the size (in degrees) of the angular coverage 510 along each axis to the size (in degrees) of the angular coverage 520 along the same axis.

Referring to FIG. 5, with the temporal articulation of the QPI/MLA assembly 230 of the spatio-temporal directional light modulator 200 of this invention having the angular coverage 520 and comprising the multiplicity of the directionally modulated light emitted corresponding with the multiplicity of pixels comprising the QPI device 210, a new set of directionally modulated light beams would be continuously added as some drop off temporally in a pipeline fashion until the expanded angular extent 510 of the spatio-temporal directional light modulator 200 of this invention is fully covered. At any given instant the full emissive aperture of the QPI/MLA assembly 230 would be utilized to accumulate (modulate) the desired intensity of the light beam (typically by pulse width modulation, though proportional control could be used if desired) at any given direction as that direction remains temporally within the coverage of the articulated aperture 510. As a result of this spatio-temporal pipelining of the multiplicity of the directionally modulated light beams, the response time of the spatio-temporal light modulator of this invention can be made to be commensurate with the image data input rate with minimal latency. The time duration a given direction remains within the angular coverage 520 would determine the modulation time available for modulating the light intensity in that direction, and as a result, unless compensated, the directions within the peripheral area of the expanded angular coverage 510 could have less intensity than the interior region of the angular coverage 520. This intensity edge tapering effect would be somewhat similar to the Fresnel losses typically encountered at the edge of an optical system except in the case of the spatio-temporal light modulator of this invention, such an effect can be compensated by appropriate selection of the rate of the temporal articulation of the QPI/MLA assembly 230 of the spatio-temporal directional light modulator 200 of this invention.

As an alternative, using the 3×3 example again, if $\Theta_x$ represents the angular extent (half angle) of one lens element around the x axis and $\Theta_y$ represents the angular extent of one lens element around the y axis and if $\alpha_x$ equals $2\Theta_x$ and $\alpha_y$ equals $2\Theta_y$, the total angular extent, including the articulation, will be three times the angular extent of one micro lens element (3 times $2\Theta_x$ or 3 times $2\Theta_y$). By way of example, for the x axis, these three contiguous angular extents will be:

$(-\alpha_x - \Theta_x)$ to $(-\Theta_x)$
$(-\Theta_x)$ to $(\Theta_x)$, and
$(\Theta_x)$ to $(\Theta_x + \alpha_x)$ each angular extent also being constituting an angular increment in articulation.

The three contiguous individual angular extents in each direction can be considered as a two dimensional angular extent matrix as follows:

1, 2, 3
4, 5, 6
7, 8, 9

This alternative is a discrete technique, namely to display angular extent 1 for an allotted time, then advance around a first axis by one angular increment and then display angular extent 2 for the same allotted time, then advance one more angular increment and display angular extent 3 for the allotted time, then advance one angular increment on the other axis to display extent 6 for the allotted time, then go back one angular increment on that axis and display angular extent 5 for the allotted time, etc. After angular extent 9 is displayed for the allotted time, one could repeat 9 (continue displaying for twice the allotted time and then backtrack to avoid more than one angular increment in one axis at a time, though this would be expected to create a flicker unless a higher rate was used. A better approach would be to go from angular extent 9 to angular extent 1, a jump of two angular increments on 2 axes at the same time. However a jump of two angular increments on 2 axes should not take twice as long as an angular change of one angular increment on one axis, as the x and y axes will be independent of each other, and any change comprises an angular acceleration followed by an angular deceleration, so the average velocity is higher for a change of two angular increments than for a change of one angular increment. Still further alternatives might include a combination of discrete and continuous techniques. The point is that there are many alternatives one could choose from, all of which are within the scope of the present invention.

One embodiment of this invention, herein referred to as 600, is illustrated in FIG. 6, which include an isometric, top view and side view illustrations of this embodiment. As illustrated in FIG. 6, the spatio-temporal directional light modulator of this invention is realized by bonding the QPI/MLA assembly 230 (depicted in FIG. 2) on the topside of the 2-axis gimbal assembly 620 which is fabricated using multiple silicon substrate layers; namely, a hinge layer 621, a spacer layer 628 and a base layer 630. As illustrated in FIG. 6, the hinge layer 621 of the 2-axis gimbal 620 is comprised of an outer frame 622, an inner ring 623 and the inner segment 625 upon which QPI/MLA assembly 230 would be bonded (625 is hereinafter also referred to synonymously as the device bonding pad 625). The gaps between the outer frame 622, the inner ring 623 and the inner segment 625 would be etched using standard semiconductor lithography techniques. The inner segment 625 is physically connected along the x-axis to the inner ring 623 by two silicon bridges 622, each typically approximately in the range of 0.3-0.5 mm wide, which would act as the x-axis hinge and would also to define the neutral x-axis position of the gimbal and act as a mechanical resistance spring for the x-axis articulation. The inner ring 623 is connected along the y-axis to the outer frame 622 by two the silicon bridges 626, each typically approximately in the range of 0.3-0.5 mm wide, which would act as the y-axis hinge and would also define the neutral y-axis position of the gimbal and act as a mechanical resistance spring for the y-axis articulation. The two pairs of silicon hinges 624 and 626 constitute the pivot points of the 2-axis gimbal around which the x and y articulation would be performed. The interior segment 625 of the hinge layer 621 of the gimbal assembly 620 contains multiplicity of contact pads to which the QPI/MLA assembly 230 will be bonded using standard soldering techniques such as flip chip solder balls, thus making the inner segment 625 become the bonding pad upon which QPI/MLA assembly 230 would be bonded. Embedded within the interior segment 625 of the hinge layer 621 of the gimbal assembly 620 are multiplicity of metal rails which connect a set of contact pads on the topside of the interior segment 625 to a set of device contact pads 627 placed along the periphery of the outer frame 622 via the x-axis and y-axis hinge bridge areas 624 and 626. The set of contact pads on the topside of the interior segment 625 are the contact pads that would provide electrical and physical contact to the backside of the QPI/MLA assembly 230.

Referring to the side view illustration of FIG. 6, the QPI/MLA assembly 230 is shown bonded to the topside of the interior segment 625. As explained earlier, this would be both an electrical and physical contact bonding between the contact pads on the topside of the interior segment 625 and the contact pad at the backside of the QPI/MLA assembly 610 using solder or eutectic ball grid array type bonding. Also illustrated in FIG. 6 side view is the spacer layer 628 which would be bonded at wafer level with the base layer 630 topside and with the hinge layer backside using BenzoCycloButene (BCB) polymer adhesive bonding or the like. The height (or thickness) of the spacer layer 626 would be selected to accommodate the vertical displacement of the corner of the hinged interior segment 625 together with the bonded QPI/MLA assembly 610 at the maximum actuation angle. For example, if the diagonal of the interior segment 625 together measures 5 mm and the maximum articulation angle at the corner is 15°, then the thickness of the spacer layer 626 should measure approximately 0.65 mm in order accommodate the vertical displacement of the corner of the hinged interior segment 625 at the maximum articulation.

Referring to the side view illustration of FIG. 6, the articulation of the hinged interior segment 625 together with the bonded QPI/MLA assembly 230 would be accomplished using a set of electromagnets 635 placed at the four corners of the backside of the hinged interior segment 625, and a set of permanent magnets 636 placed on the topside of base layer 630 in alignment with the four corners of the backside of the hinged interior segment 625. The electromagnets 635 would be a coil having a metal core formed at wafer level using multilayer imprint lithography on the backside of the hinged interior segment 625. The permanent magnets 636 would be a thin magnetic strip typically of neodymium magnet ($Nd_2Fe_{14}B$) or the like. Articulation of the hinged interior segment 625 together with the bonded QPI/MLA assembly 230 as described earlier would be accomplished by driving the set of electromagnets 635 with an electrical signal having the appropriate temporal amplitude variation to affect the appropriate temporal variation in the magnetic attraction between the set of electromagnets 635 and permanent magnets 636 that would cause of the hinged interior segment 625 together with the bonded QPI/MLA assembly 230 to be temporally articulated as described earlier. The drive electrical signals to the set of electromagnets 635, which are generated by the QPI device 210 and supplied to the set of electromagnets 635 via the metal rails and contacts incorporated in the hinged interior segment 625 described earlier, would be made synchronous with the pixel modulation performed by the QPI device 210 to the extent that will enable the desired directional modulation of the intensity and color modulated light emitted from the pixel array of the QPI device 210. The temporal variation of the drive electrical signals to the set of electromagnets 635 would be selected to enable the temporal angular articulation of the hinged interior segment 625 together with the bonded QPI/MLA assembly 230 around both of their x-axis and y-axis as illustrated in FIG. 6. Depending on the thickness of the silicon substrate of the hinge layer 621 and the selected width of the silicon hinges 624 and 626, the maximum value $\pm\alpha_{max}$ of the temporal angular articulation $\alpha(t)$ illustrated in FIG. 4B that can be achieved by embodiment 600 of this invention would typically be in the range from $\pm15°$ to $\pm17°$.

The drive electrical signals to the set of electromagnets 635, which are generated by the QPI device 210 and supplied to the set of electromagnets 635 via the metal rails and contacts incorporated in the hinged interior segment 625 described earlier, would be comprised of a base component and a correction component. The base component of the drive electrical signals to the set of electromagnets 635 would represent a nominal value and a correction component would be derived from an angular articulation error value generated by a set of four sensors positioned on the backside of the hinged interior segment 625 in alignment with the hinges 624 and 626. These sensors would be an array of infrared (IR) detectors placed on the backside of the interior segment 625 in alignment with four IR emitters placed on the topside of the base layer 630. The output values these four IR detector arrays will be routed to the QPI device, again via the metal rails and contacts incorporated in the hinged interior segment 625 described earlier, and used to compute an estimate of the error between the derived and the actual articulation angle which will be incorporated as a correction to the drive signals provided by the QPI to the set of electromagnets 635. The sensors positioned on the backside of the hinged interior segment 625 could also be micro-scale gyros properly aligned to detect the actuation angle along each of the 2-axis of the gimbal.

Another embodiment of this invention is illustrated in FIG. 7, herein referred to as 700. FIG. 7 includes isometric views and side view illustrations of this embodiment. As illustrated in FIG. 7, the embodiment 700 of this invention is comprised of the 2-axis gimbal 720 with the QPI/MLA assembly 230 bonded on top of it. FIG. 7 also shows an exploded isometric illustration of the embodiment 700 that shows the constituent layers of the 2-axis gimbal 720 of this embodiment. As illustrated in FIG. 7, the spatio-temporal directional light modulator of this invention is realized by bonding the QPI/MLA assembly 230 (depicted in FIG. 2) on the topside of the 2-axis gimbal assembly 720 which is fabricated using multiple silicon substrate layers; namely, a pad layer 721, a spring layer 725 and a base layer 730. The topside of the pad layer 721 incorporates a multiplicity of contact pads to which the QPI/MLA assembly 230 is to be bonded using standard soldering techniques such as flip chip solder balls, thus making the topside of the pad layer 721 being the bonding pad 723 upon which QPI/MLA assembly 230 would be bonded. The backside of the pad layer 721 incorporates the spherical pivot 735 which would be formed by embossing polycarbonate polymer on the backside of the hinged pad layer 721 at the wafer level using UV imprint lithography or the like. The pad layer 712 together with the spherical pivot 735 embossed on its backside will be referred to as hinged pad 721/735. The elevation of the center of the spherical pivot 735 determines the elevation of the x and y axes of the angular deflection. The topside of the base layer 730 incorporates the spherical socket 736 which would be formed by embossing of polycarbonate polymer on the topside of the base layer 730 at the wafer. The base layer 730 together with the spherical socket 736 embossed on its topside will be referred to as the pedestal 730/736. The surface curvature the spherical pivot 735 incorporated on the backside of the pad layer 721 and the spherical socket 736 incorporated on the topside of the base layer 730 will be ±matched in order to allow the hinged pad 721/735 to make it a 2-axis articulated pad when placed on top of the pedestal 730/736. Although the embossed surfaces of the spherical pivot 735 and socket 736 will be of optical quality in terms of surface roughness in the order of a few nm RMS, possible friction between the two surfaces due to the articulation movement would be reduced by coating the surfaces of the spherical pivot 735 and socket 736 with a thin layer (50-100 nm) of graphite.

The hinged pad 721/735 is retained in place within the surface curvature of the pedestal 730/736 by the spring layer 725 which contains at each of its four corners a single spiral shaped spring 726 that is etched into the spring layer 725. As illustrated in FIG. 7 exploded view isometric, the inner end of each of the four spiral shaped springs incorporates an inner bonding pad 727 which corresponds to an identical bonding pad 722 located at the backside of the pad layer 721. Embedded within the spiral shaped springs 726 are multiple metal rails that are used to route the electrical interface signals from its inner bonding pad 727 to a set of contact pads 728 located at the peripheral edge of the backside of the spring layer 725. The edge contacts 728 on the backside of the outer end of the spring layer 725 correspond to a matching set of bonding pads 729 that are located at the peripheral edge of the base layer 730. The edge contacts on the topside of the base layer 730 are connected via metal rails embedded within the base layer to a set of device contact pads 731 that are located on the backside of the base layer 730. In the final assembly of the embodiment 700 of this invention, illustrated in the side view of FIG. 7, the four spiral shaped springs 726 will be expanded when the backside bonding pads 726 of the spring layer 725 is bonded to the topside bonding pad 729 of the base layer 730 and the inner bonding pad 727 of the spiral spring 726 is bonded the corresponding bonding pad 722 on the backside of the pad layer 721. When the spring layer 725 is bonded to the backside of the pad layer 721 and to the topside of the base layer 730 spiral springs 726 as just explained, the four spiral springs become fully expanded and in that full expanded configuration they serve the multiple purposes of: (1) creating a spring load resistance needed to retain the spherical pivot 735 within the spherical socket 736; (2) creating the mechanical balance needed for sustaining the neutral position of the hinged pad 721/735; and (3) routing the electrical interface signals from the device contact pads 731 to the contact pad 723 of the QPI/MLA assembly 230. Referring to the side view illustration of FIG. 7, the QPI/MLA assembly 230 is shown bonded to the topside contact pad 723 of the pad layer 721. This would be both an electrical and physical contact bonding between the contact pads 723 and the contact pad at the backside of the QPI/MLA assembly 230 using solder or eutectic ball grid array type bonding. In the operational configuration the full device assembly 700 would be bonded using the contact pad 731 located on the backside of the base layer to a substrate or printed circuit board using solder or eutectic ball grid array type bonding.

Also illustrated in FIG. 7 side view is the extended height of the spherical socket 736 which would be selected to accommodate the vertical displacement of the corner of the hinged pad 721/735 together with the bonded QPI/MLA assembly 230 at the maximum actuation angle. For example, if the diagonal of the hinged pad 721/735 together with the bonded QPI/MLA assembly 230 measures 5 mm and the maximum actuation angle at the corner is ±30°, then the thickness of the extended height of the spherical socket 736 should measure approximately 1.25 mm in order accommodate the vertical displacement of the corner of the of the hinged pad 721/735 together with the bonded QPI/MLA assembly 710 at the maximum actuation angle.

The actuation of the hinged pad 721 together with the bonded QPI/MLA assembly 230 would be accomplished using a set of electromagnets embedded within the spherical pivot 735 and a set of permanent magnets embedded within the spherical socket 736. The actuation electrical drive signal would be routed to electromagnets embedded within the spherical pivot 735 in order to affect the actuation movement described in the earlier paragraphs. The base component of the actuation electrical drive signals to the electromagnets embedded within the spherical pivot 735 would represent a nominal value and a correction component that would be derived from an angular articulation error value generated by a set of four sensors positioned on the backside of the hinged pad 721. These sensors are an array of infrared (IR) detectors placed on the backside of the hinged pad 721 in alignment with four IR emitters placed on the topside of the base layer 730. The output values these four IR detector arrays will be routed to the QPI device, again via the metal rails and contacts incorporated in the hinged pad 721 described earlier, and used to compute an estimate of the error between the derived and the actual articulation angle which will be incorporated as a correction to the drive signals provided by the QPI device to the set of electromagnets embedded within the spherical pivot 735. The sensors positioned on the backside of the hinged pad 721 could also be micro-scale gyros properly aligned to detect the actuation angle along each of the 2-axis of the gimbal.

The permanent magnets embedded within the spherical socket 736 would be a thin magnetic rods or wires, typically of neodymium magnet ($Nd_2Fe_{14}B$) or the like, and would be shaped to provide a uniform magnetic field across the curved cavity of the spherical socket 736. Actuation of the hinged pad 721 together with the bonded QPI/MLA assembly 230 as described earlier would be accomplished by driving the set of electromagnets embedded within the spherical pivot 735 with an electrical signal having the appropriate temporal amplitude variation to affect the appropriate temporal variation in the magnetic attraction between the set of electromagnets embedded within the spherical pivot 735 and permanent magnets embedded within the spherical socket 736 that would cause of the hinged pad 721 together with the bonded QPI/MLA assembly 230 to be temporally articulated as described earlier. The drive electrical signals to the set of the set of electromagnets embedded within the spherical pivot 735, which are generated by the QPI device and routed via the metal rails and contacts incorporated on the hinged pad 721 described earlier, would be made synchronous with the pixel modulation performed by the QPI device to an extent that will enable the desired directional modulation of the intensity and color modulated light emitted from the pixel array of the QPI device. The temporal variation of the drive electrical signals to the set of electromagnets embedded within the spherical pivot 735 would be selected to enable the temporal angular articulation of the hinged pad 721 together with the bonded QPI/MLA assembly 230 along both of their x-axis and y-axis as illustrated in FIG. 6. Depending on the extended height of the spherical socket 736 which governs the maximum vertical displacement of the corner of the hinged pad 721 together with the bonded QPI/MLA assembly 230, the maximum value $\pm\alpha_{max}$ of the temporal angular articulation $\alpha(t)$ illustrated in FIG. 6 that can be achieved by the embodiment 700 of this invention would typically be in the range from ±30° to ±35°.

A person skilled in the art would know that the gimbal actuators of the embodiments 600 and 700 of this invention described in the previous paragraphs can be implemented to achieve substantially the same objective by exchanging the positions of the electromagnets and the permanent magnets.

The two exemplary embodiments 600 and 700 of this invention differ mainly in the maximum value $\alpha_{max}$ of the temporal angular articulation $\alpha(t)$ each can achieve and in the outer area each embodiment needs beyond the boundary of the QPI/MLA assembly 230. First, as illustrated in FIG. 7, in the embodiment 700 of this invention the 2-axis gimbal is fully accommodated within the footprint area of the QPI/MLA assembly 230 (hereinafter refer to a zero-edge feature) while as illustrated in FIG. 6 in the embodiment 600 of this invention the 2-axis gimbal is accommodated at the outer periphery of the QPI/MLA assembly 230 outer boundary. Second, the maximum value $\alpha_{max}$ of the temporal angular articulation $\alpha(t)$ embodiment 700 can achieve could possibly be twice as large as what could be provided embodiment 600. Of course the larger maximum value $\alpha_{max}$ of the temporal angular articulation $\alpha(t)$ that can be accomplished by the embodiment 700 comes at the expense of requiring larger vertical height than the embodiment 600. The zero-edge feature of the embodiment 700 makes it more suitable for being tiled to create a large area display while the low profile (low height) feature of the embodiment 600 makes it more suitable for creating compact displays for mobile applications.

Figure 8A:
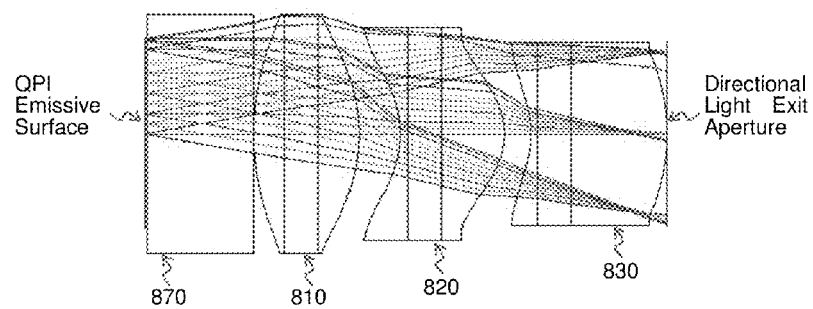
FIG. 8A illustrates an exemplary collimating wafer level optics design of the spatio-temporal directional light modulator of this invention.

FIG. 8A shows an exemplary embodiment of one element of the MLA 220 and its associated pixel group $G_i$ of the QPI device 210 that can be used within the context of the present invention. Referring to FIG. 8A, as explained earlier the light emitted from each individual pixel within a pixel group $G_i$ travels from the QPI emissive surface to the exit aperture of a micro lens element that comprises the three optical elements 810, 820 and 830. The light emitted from each individual pixel within a pixel group $G_i$ would be collimated and magnified to fill the exit aperture of the MLA 220 micro lens system 810, 820 and 830 and traverses at a specific direction within a $\Theta=\pm15°$ angular extent. In essence the micro lens system illustrated in FIG. 8A comprising the optical elements 810, 820 and 830 would map the light emitted from the individual pixels comprising the two dimensional pixels of the pixel group $G_i$ into individual directions (see FIG. 3) within the three dimensional volume defined by $\Theta=\pm15°$ angular extent of the MLA 220 micro lens system 810, 820 and 830.

The angular extent Θ of the MLA 220 micro lens system 810, 820 and 830 can be made either larger or smaller than the ±15° of the exemplary embodiment of FIG. 8A through appropriate design selection of the refracting surfaces of the micro lens system 810, 820 and 830 or by increasing or decreasing the number of its optical elements. It should be noted, however, that for a given resolution in terms of number of pixels within the pixel modulation group $G_i$, changing the angular extent Θ of the MLA 220 micro lens system would result in a change in the angular resolution (separation) between the directionally modulated light beams emitted by the QPI/MLA assembly 230 of the spatio-temporal directional light modulators of this invention. For example with the Θ=±15° angular extent of the previous exemplary embodiment, if the pixel group $G_i$ comprises (128×128) pixels, then the angular resolution between the directionally modulated light beam emitted by the QPI/MLA assembly 230 of the spatio-temporal directional light modulators of this invention would be approximately δΘ=0.23°. This same angular resolution value of δΘ=0.23° can also be achieved by reducing the angular extent of the MLA 220 micro lens system to Θ=±7.5° and the number of pixels comprising the pixel group $G_i$ to (64×64) pixels. In general using a higher F/# (i.e., smaller value of the angular extent Θ) for the MLA 220 micro lens system would allow achieving a given angular resolution value using a smaller pixel modulation group $G_i$ size, which in turn would result in the availability of more pixels within a given pixel resolution of the QPI device 210 to create more of the pixel groups $G_i$ and consequently higher spatial resolution than can be achieved by the QPI/MLA assembly 230 of the spatio-temporal directional light modulators of this invention. This deign tradeoff would allow selecting the appropriate balance between the F/# of the MLA 220 micro lens system design parameters and spatial resolution that can be achieved by the QPI/MLA assembly 230. On the other hand, when the F/# of the MLA 220 micro lens system is increased to increase the spatial resolution, the angular extent that can be achieved by the QPI/MLA 220 of the spatio-temporal directional light modulators of this invention would be reduced. At this point the maximum value $\alpha_{max}$ of the temporal angular articulation α(t) of this invention will become a part of the design tradeoff to recover the angular extent lost in favor of increasing the spatial resolution. In the previous example when the maximum value $\alpha_{max}$ of the articulation angle is selected to be $\alpha_{max}$=±7.5°, the spatio-temporal directional modulator of this invention will be able to achieve a expanded angular extent of ($\alpha_{max}$+Θ)=±15° using the pixel group $G_i$ of (64×64) pixels. In essence for a given angular resolution value of δΘ, the maximum value of the articulation angle $\alpha_{max}$ comes into the tradeoff as a parameter that can be used either to increase the angular extent of the directional modulation or the spatial resolution that can be achieved by the spatio-temporal directional modulators of this invention.

Figure 8B:
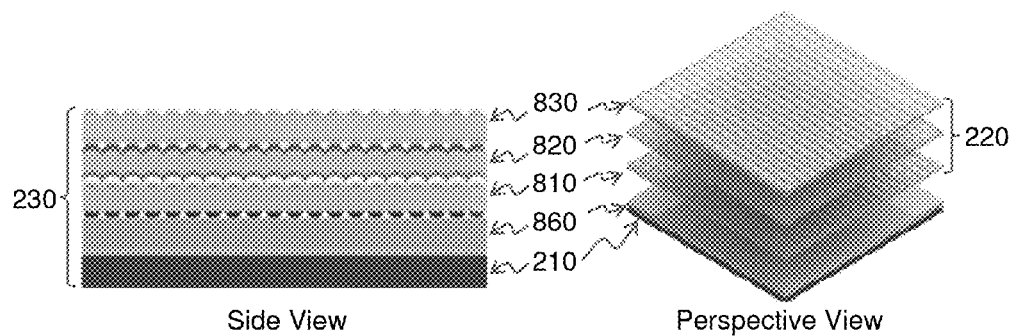
FIG. 8B illustrates an exemplary embodiment of the full assembly of the emissive micro emitter array device and the collimating wafer level optics of the spatio-temporal directional light modulator of this invention.

FIG. 8B shows an exemplary embodiment of the full assembly of the QPI/MLA assembly 230 of the spatio-temporal directional light modulators of this invention. The multiplicity of the micro lens elements 810, 820 and 830 are fabricated to form the micro lens arrays layers 840, 850 and 860 which would be precisely aligned relative to each other and relative to the associated arrays of the QPI pixel groups ($G_1, G_2, \ldots, G_N$). The exemplary embodiment illustrated in FIG. 8B also includes the QPI device 210 and its associated cover glass 870. The design of the micro lens elements 810, 820 and 830 would take into account the thickness and optical characteristics of the QPI cover glass 870 in order to image the emissive surface of the QPI device 210. The exemplary embodiment of FIG. 8B illustrates the full assembly of the QPI/MLA assembly 230 that can be used within the context of the spatio-temporal directional light modulators of this invention. Using the exemplary embodiment of FIG. 8B, the typical total thickness of the embodiments 600 and 700 of the spatio-temporal directional light modulator of this invention would be less than 5 mm. Such compactness of the directional light modulator of this invention is not possibly achievable by directional light modulation techniques of the prior art.

It should be noted that unlike prior art that uses a scanning mirror to tempo-directionally modulate a light beam, the spatio-temporal light modulators of this invention differs in one very important aspect in that it generates, at any given instance of time, a multiplicity of light beams that are directionally modulated simultaneously. In the case of the spatio-temporal light modulators of this invention, the multiplicity of directionally modulated light beams would be temporally multiplexed by the articulation of the gimbaled QPI/MLA assembly 230 to expand the directional modulation resolution and angular extent. As explained earlier (see FIG. 5), as the gimbaled QPI/MLA assembly 230 is articulated a new set of directionally modulated light beams are added as some drop off temporally in a pipeline fashion until the expanded angular extent provided by the spatio-temporal light modulators of this invention is fully covered. Accordingly, at any given instant the full emissive aperture of the gimbaled QPI/MLA assembly 230 is utilized to accumulate the desired intensity at any given direction as that direction remains temporally within the coverage of the articulated aperture of QPI/MLA assembly 230. As a result of this temporal pipelining of the multiplicity of the directionally modulated light beams, the response time the spatio-temporal light modulator of this invention can be made to be commensurate with the image data input rate with minimal latency. In addition, the articulation of the gimbaled QPI/MLA 230 QPI/MLA assembly 230 of the spatio-temporal directional light modulators of this invention can be made in a non-stop pattern that would result in minimal or no blanking of the emissive aperture of the gimbaled QPI/MLA 230 as it is articulated across the expanded angular extent of the spatio-temporal light modulators of this invention. Thus, the slow response time, poor efficiency and large volume drawbacks of prior art directional light modulators are all substantially overcome by the spatio-temporal light modulators of this invention.

Figure 9A:
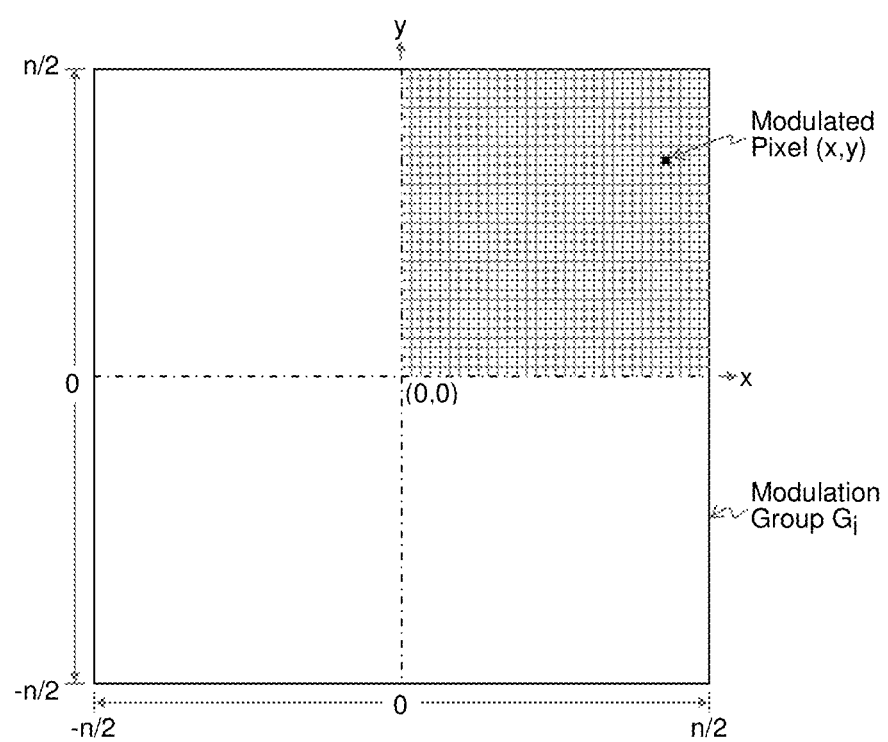
FIG. 9A illustrates an exemplary embodiment of directional addressability within one of the spatial modulation pixel groups of the spatio-temporal directional light modulator of this invention.
Figure 9B:
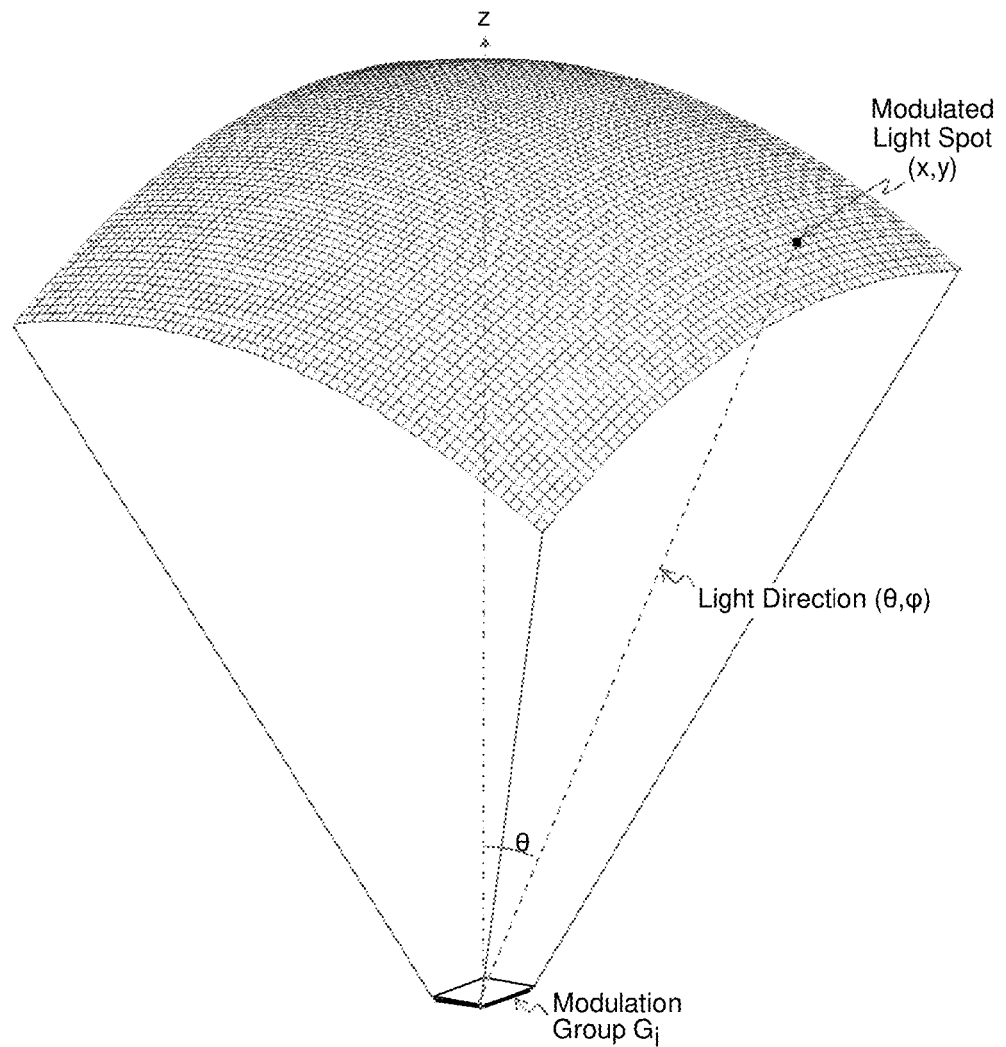
FIG. 9B illustrates an exemplary embodiment of directional modulation within one of the spatial modulation pixel groups of the spatio-temporal directional light modulator of this invention.

FIG. 9A and FIG. 9B illustrate the operational principles of the spatio-temporal directional light modulators of this invention. FIG. 9A illustrates an exemplary embodiment of one of the pixel groups $G_i$ being comprised of a two dimensional array of (n×n) of the emissive pixels of the QPI device 210 whereby for convenience the size of the pixel group $G_i$ along one axis would be selected to be n=$2^m$. Referring to FIG. 9A, the directional modulation addressability that can be achieved by the pixel group $G_i$ would be accomplished through the addressability of the (n×n) pixels comprising the modulation group $G_i$ along each of its two axes x and y using m-bit words. FIG. 9B illustrates the mapping of the light emitted from (n×n) pixels comprising the QPI pixel modulation group $G_i$ into individual directions within the three dimensional volume defined by angular extent Θ of the associated MLA 220 micro lens element such as that of the exemplary embodiment illustrated in FIG. 8A. As an illustrative example, when the dimensions of the individual pixels of the QPI are (5×5) microns and the QPI pixel group $G_i$ is comprised of (n×n)=($2^7$×$2^7$)=(128×128) pixel array and the angular extent of the associated MLA 220 micro lens element is Θ=±15°, then from each of the QPI two dimensional modulation pixel groups $G_i$ of size (0.64×0.64) millimeter at the QPI emissive surface it would be possible to generate $(128)^2$=16,384 individually addressable directional light beams spanning the angular extent of $\Theta=\pm15°$ whereby the light generated in each of the 16,384 directions can be individually modulated in color and intensity as well. When the QPI/MLA assembly 230 is articulated as described earlier (see FIG. 2 and FIG. 4A) using the 2-axis gimbals of the embodiments 600 and 700, the directional modulation angular extent provided by the lens elements of the QPI/MLA assembly 230 will be temporally extended by the maximum articulation angle $\pm\alpha_{max}$ provided by the gimbal. Thus the directional modulation angular extent provided by the spatio-temporal directional light modulator of this invention would be temporally extend over an angular coverage totaling $\pm(\Theta+\alpha_{max})$. For example when the angular extent of the MLA 220 lens element is $\Theta=\pm15°$, and the maximum articulation angle $\alpha_{max}=\pm30°$, then the expanded angular extent that would provided by the spatio-temporal directional light modulator of this invention would be $(\Theta+\alpha_{max})=\pm45°$, and the light modulation directions it would able to temporally generate would be $[n(\Theta+\alpha_{max})/\Theta]^2=9\times$ the number of light modulation directions that can be generated by the QPI/MLA assembly 230 (see FIG. 5); namely, $9(128)^2=147,456$ light modulation directions. Meaning that the number of light modulation directions that can be generated by the spatio-temporal directional light modulator of this invention would be (3n×3n), where (n×n) is the size, in terms of number of QPI pixels, of the pixel groups $G_i$ associated with one of the MLA 220 lens elements. Thus, for this example the spatio-temporal directional light modulator of this invention would offer an expanded directional modulation resolution to 9× the directional modulation resolution provided by QPI/MLA assembly 230. In general, the directional modulation resolution provided by the spatio-temporal directional light modulators of this invention would $[n(\Theta+\alpha_{max})/\Theta]^2$ within an angular extent that extends over an angle of $\pm(\Theta+\alpha_{max})$.

In addition to the directional modulation capabilities for the spatio-temporal directional light modulator of this invention, spatial modulation would also be possible using an array of (N×M) of the QPI pixel modulation groups $G_i$ such as that described in the previous design example. If, for example, it is required to create a directional light modulator of this invention with spatial modulation resolution of N=16 by M=16 that provides the $(9\times128)^2=147,456$ directional modulation resolution of the previous example, the spatio-temporal directional light modulator of this invention would comprise an array of (16×16) directional modulation groups $G_i$ and when a QPI with (5×5) micron pixel size is used, the total size of the spatio-temporal directional light modulator would be approximately 10.24×10.24 mm. Using the angular extent values of the previous example, the light emitted from such a spatio-optical directional light modulator of this invention can be spatially modulated at a resolution of (16×16) and directionally modulated at a resolution of 147,456 within the angular extent ±45°, and can also be modulated in color and intensity in each direction.

As illustrated by the previous examples, the spatial and directional modulation resolutions of the spatio-temporal light modulator of this invention in terms of the number of individually addressable directions within a given the angular extent would be determined by selecting the resolution and pixel pitch of the emissive micro emitter array QPI device 210, the pitch of the MLA 220 lens elements, the angular extent of the MLA 220 lens elements and the maximum articulation angle of the modulator gimbal. It is obvious to a person skilled in the art that the MLA lens system can be designed to allow either wider or narrower angular extent, the gimbal design can be selected to allow either wider or narrower articulation angle and the number of pixels within each modulation group can be selected either smaller or larger in order to create a spatio-temporal directional light modulator that can achieve any desired spatial and directional modulation capabilities following the teachings provided in the preceding discussion.

Figure 10:
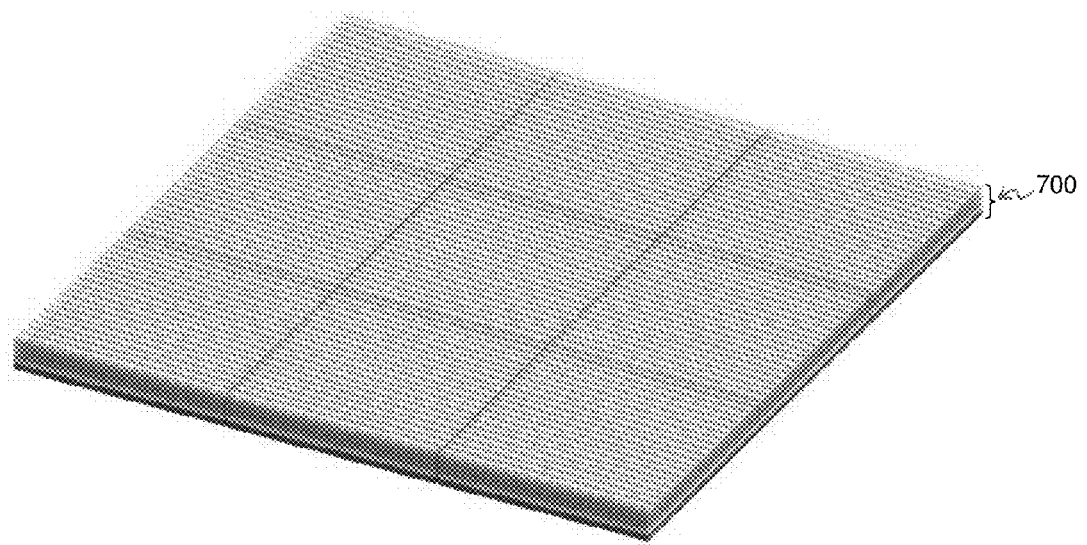
FIG. 10 illustrates a block diagram explaining the data processing block diagram of the spatio-temporal directional light modulator of this invention.

Any desired spatial and directional modulation capabilities can be realized using the spatio-optical directional light modulators of this invention. The previous example illustrated how a spatio-optical directional light modulator of this invention with $(16)^2$ spatial resolution and $(3\times128)^2$ directional resolution can be implemented using a single 10.24× 10.24 mm QPI device 210. In order to realize higher spatial resolution, the spatio-temporal directional light modulator of this invention can be implemented using a tiled array comprising multiplicity of smaller spatial resolution spatio-temporal directional light modulator of this invention. For example, when an array of (3×3) of the spatio-temporal directional light modulator of the previous example are tiled as illustrated in FIG. 10, the resultant spatio-temporal directional light modulators would provide $(3\times16)^2$ spatial resolution and $(3\times128)^2$ directional resolution. The tiling of a multiplicity of the spatio-temporal directional modulator of this invention in order to realize a higher spatial resolution version is possible because of its compact volumetric dimensions. For example, the spatio-temporal directional light modulator of the previous example that uses a single QPI device 210, which by itself would have an exemplary width, height and thickness of 10.24×10.24×5 mm; respectively, can be used to create the larger resolution version illustrated in FIG. 10 which would have the dimension of 3.07×3.07×0.5 cm in width, height and thickness; respectively. If, for example, the tiling is expanded to include an array of (30×30) of the smaller resolution spatio-temporal directional light modulator, the resultant spatio-temporal directional light modulator would have a $(30\times16)^2$ spatial resolution and $(3\times128)^2$ directional resolution and would measure 30.07×30.07×0.5 cm in width, height and thickness, respectively. It would be possible to implement the higher spatial resolution version of the spatio-temporal directional light modulator of this invention illustrated is FIG. 10 by bonding multiplicity of the spatio-temporal directional light modulators of the previous example to a backplane using electrical contacts of the micro ball grid array (MBGA) located on its backside, which given the zero-edge feature of embodiment 700, would make it possible to realize seamless tiling of a multiplicity of such directional light modulator devices to implement any desired size of the spatio-temporal directional light modulator of this invention. Of course the size of the array of spatio-temporal directional light modulators illustrated in FIG. 10 can be increased to the extent needed to realize any desired spatial resolution. It is also possible to tradeoff the directional resolution of the spatio-temporal directional light modulator of this invention for an increased spatial resolution. For example, if the pixel modulation group size is reduced to (64×64), the (3×3) array illustrated in FIG. 10 would provide $(3\times32)^2$ spatial resolution and $(3\times64)^2$ directional resolution. It is worth noting that the array of spatio-temporal directional light modulators which offers the expanded spatial aperture illustrated in FIG. 10 is made possible by the zero-edge feature described earlier of the spatio-temporal directional light modulator embodiment 700 of this invention.

The principle of operation of the spatio-temporal directional light modulator of this invention will be described in reference to the illustrations of FIGS. 9A and 9B. FIG. 9A illustrates the two dimensional addressability of each of the modulation group $G_i$ using m-bit resolution for the directional modulation. As explained earlier, light emitted from ($2^m \times 2^m$) individual pixels of the modulation group $G_i$ is mapped by its associated MLA 220 elements into $2^{2m}$ light directions within the angular extent ±Θ of the associated MLA micro lens element. Using the (x, y) dimensional coordinates of the individual pixels within each of the modulation groups $G_i$, the angular coordinates (θ,φ) of the emitted light beam is given by:

$$\theta(t) = \alpha_x(t) + \arctan\left[\frac{\sqrt{x^2 + y^2} \times \tan(\Theta)}{0.5 \times (n-1)}\right] \quad \text{Eq. 1}$$

$$\varphi(t) = \alpha_y(t) + \arctan\left[\frac{y}{x}\right] \quad \text{Eq. 2}$$

Where the $\alpha_x(t)$ and $\alpha_y(t)$ are values of the articulation angles around the x-axis and y-axis at the time epoch t; respectively, the angles θ(t) and φ(t) are the values of the directional modulation spherical coordinates at the time epoch t with the polar axis at θ=0 parallel to the z-axis of the emissive surface of the modulation group $G_i$ and m=$\log_2$ n is the number of bits used to express the x and y pixel resolution within the modulation group $G_i$. The spatial resolution of the spatio-temporal directional light modulator of this invention is defined the coordinates (X, Y) of each of the individual modulation group $G_i$ within the two dimensional array of modulation groups comprising the overall spatio-temporal directional light modulator. In essence, the spatio-temporal light modulator of this invention would be capable of temporally generating (modulating) a light field described by the spatial coordinates (X, Y) defined by its modulation group array and the directional coordinates (θ,φ) with the latter being defined by the values of the coordinates (x, y) of the emissive pixels within the modulation group $G_i$ and the temporal value of the articulation angle of the spatio-temporal directional light modulator as defined by Eq. 1 and 2 above.

Figure 11:
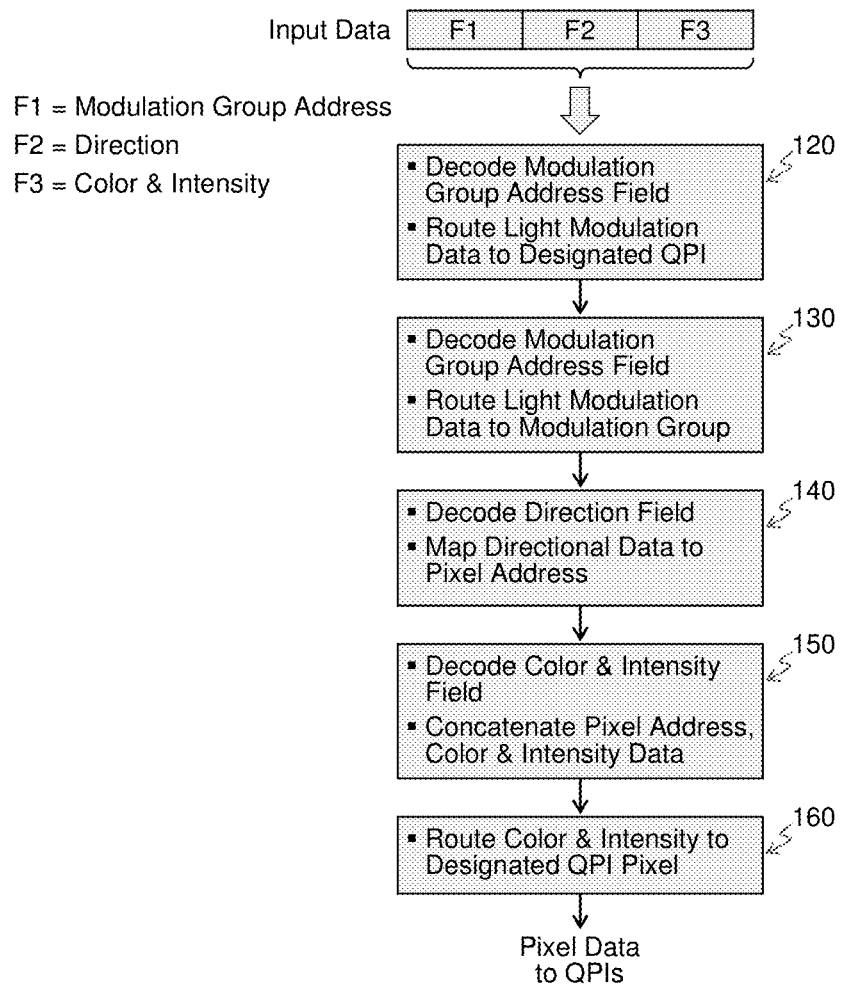
FIG. 11 illustrates an isometric view of an exemplary embodiment of a 3D/2D switchable display implemented by tiling a multiplicity of the spatio-temporal directional light modulator of this invention.

FIG. 11 illustrates an exemplary embodiment of the data processing block diagram of the spatio-temporal directional light modulator of this invention. The input data to the spatio-temporal directional light modulator of this invention will be formatted in multiple bit words whereby each input word contains the three data fields; one field being the address of modulation group $G_i$ within the modulation group array comprising the spatio-optical directional light modulator while the remaining two data fields provide the data representation of the light to be emitted from that modulation group in terms of its color, intensity and direction. Referring to FIG. 11, the data processing block 120 decodes the modulation group address field of the input data and route the light modulation data fields to the QPI device associated with the designated modulation group. The data processing block 130 decodes the routed modulation group address field and maps it to the address of the designated modulation group. The data processing block 140 decodes the directional modulation data field and maps it into the address of designated pixel address within the modulation group. The data processing block 150 concatenates the resultant pixel address with the associated light intensity and color data fields of the input data. The data processing block 160 decodes the designated pixel address and routes the light modulation data to the designated pixel within the designated QPI device comprising the spatio-optical directional light modulator.

In using 16-bit for representing the directional modulation and the typical 24-bit for representing the modulated light intensity and color in each direction, the total number bits that would represent the modulation data word for each modulation group would be 40-bit. In assuming, without loss of generality, that such 40-bit words would be inputted to the spatio-temporal directional light modulator of this invention for addressing its constituent modulation groups sequentially; i.e., sequential addressing is used to input the modulation group data 40-bit words, block 120 of FIG. 11 would be responsible for routing the sequentially inputted data word to the designated QPI device. Block 130 of FIG. 11 would be responsible for routing the modulation data to the designated modulation group. Block 140 of FIG. 11 would be responsible for mapping the 16-bit directional modulation data field into the designated address of the pixel with the designated modulation group. Block 150 of FIG. 10 would be responsible for concatenating the 24-bit light intensity and color data with the mapped pixel group address. Block 160 of FIG. 11 would be responsible for routing the 24-bit light intensity and color modulation data to the designated pixel within the designated QPI device comprising the spatio-temporal directional light modulator. With this exemplary data processing flow of the 40-bit word sequential data input, the spatio-temporal directional light modulator of this invention would modulate the light emitted from its aperture in intensity, color and direction based on the information encoded within its input data.

Possible Applications

The spatio-temporal directional light modulator of this invention can be used to implement a 3D display with an arbitrary size that is realized, for example, as a tiled array of multiplicity of spatio-temporal directional light modulator devices such as that illustrated in FIG. 10. The expanded angular extent that can be realize by the spatio-temporal directional light modulator of this invention would enable the realization of 3D displays that are volumetrically compact and provide a large viewing angle, yet without the use of bulky and costly optical assemblies. The level of volumetric compactness that can be achieved by the spatio-temporal directional light modulator of this invention will enable the realization of both desk top as well as possibly mobile 3D displays. Furthermore, the expanded directional modulation capabilities of the spatio-temporal directional light modulator of this invention makes it capable of modulating within its expanded angular extent a multiplicity of views with an angular resolution value of δΘ that is commensurate with the human visual system eye angular separation, thus making it a 3D display that will not require the use of glasses to view the 3D content it display. In fact, given the high number of independently modulated light beams the spatio-temporal directional light modulator of this invention can generate, it would be capable of modulating a 3D image with sufficient angular resolution value between the generated multiple views that will eliminate the vergence-accommodation conflict (VAC) which typically hinders the performance of 3D displays and cause visual fatigue. In other words, the angular resolution capabilities of the spatio-temporal directional light modulator of this invention make it capable of generating a VAC-free 3D images that will not cause viewers' visual fatigue. The light field modulation capabilities of the spatio-temporal directional light modulator of this invention also makes it the underlying bases of a 3D light field display that can be used to implement a synthetic holography 3D displays.

The spatio-temporal directional light modulator of this invention can also be used as a backlight for liquid crystal display (LCD) to implement a 3D display. The spatio-temporal directional light modulator of this invention can also be operated as a 2D high resolution display. In this case the individual pixels of the QPI device 210 would be used to modulate the color and intensity while the MLA 220 would be used to fill the viewing angle of the display. It is also possible for the spatio-temporal light modulator of this invention to be switched from 2D to 3D display modes by adapting the format of its input data to be commensurate with the desired operational mode. When the spatio-temporal directional light modulator of this invention is used as a 2D display its light angular extent will be that of associate with its MLA 220 micro lens element plus the articulation angle of its gimbal $\pm(\Theta+\alpha_{max})$ with the pixel resolution of the individual modulation group $G_i$ leveraged to achieve higher spatial resolution.

What is claimed is:

1. A directional light modulator comprising:
   a two dimensional emissive micro emitter array device having an array of individually addressable emissive pixels;
   a micro lens array of micro lens elements;
   the two dimensional emissive micro emitter array device and the micro lens array being assembled together and angularly articulated as a single assembly in an angular motion having a periodicity selected to enable temporal coverage of the maximum articulation angle within an image frame duration to emit light around two axes within a plane of an emissive surface of the emissive micro emitter array and within a range of plus and minus a maximum angular articulation in each respective axis.

2. The directional light modulator of claim 1 wherein the two dimensional emissive micro emitter array comprises an array of pixels wherein each pixel is a solid state light emitter that is individually addressable.

3. The directional light modulator of claim 2 wherein each pixel of the two dimensional emissive micro emitter array has dimensions not exceeding 20 by 20 microns.

4. The directional light modulator of claim 2 wherein each pixel is individually addressable to modulate light it emits in both color and intensity.

5. The directional light modulator of claim 2 comprising a plurality of two dimensional emissive micro emitter array devices and a plurality of micro lens arrays being comprised of a plurality of micro lens arrays fabricated using ultraviolet imprint lithography at the wafer level to be precisely aligned relative to one another and relative to the pixel array using semiconductor wafer level alignment techniques.

6. The directional light modulator of claim 1 wherein each micro lens element of the micro lens array is associated and aligned with a plurality of micro emitters forming a pixel group within the two dimensional array of micro emitters, with each micro lens element optically mapping light emitted from the plurality of micro emitters associated with that micro lens element into a corresponding set of directions within an angular extent in each of the two axes defined by a numerical aperture of each micro lens element.

7. The directional light modulator of claim 6 comprising a two dimensional array of the pixel groups whereby each of the individual pixels in each of the pixel groups is individually addressable to generate light that is modulated in color, intensity and direction, thereby enabling the light modulator to generate spatially modulated light that is also modulated in color, intensity and direction.

8. The directional light modulator of claim 7 having a spatial resolution that is determined by the number of pixel groups along each axis of the two dimensional array of pixel groups and having a directional resolution that is determined by the number of individual light directions within the temporally expanded set of light directions.

9. The light modulator of claim 7 being capable of generating a light field defined by the two dimensional array of the pixel groups, the set of directions within the angular extent in each of the two axes, and the articulation in each respective axis.

10. The directional light modulator of claim 6 wherein each of the micro lens elements of the micro lens array is comprised of at least one lens element having at least one refracting surface whereby the number of lens elements and the number of their associated refracting surfaces determines the angular extent and angular resolution.

11. The directional light modulator of claim 6 wherein spatial and directional resolution are determined by the size of the pixel group, a resolution and pixel pitch of the two dimensional emissive micro emitter array device, lens pitch of the micro lens array, the angular extent and a maximum articulation angle.

12. The directional light modulator of claim 1 wherein the angular articulation is provided by a gimbal support for the assembly of the two dimensional emissive micro emitter array device and the micro lens array for temporally expanding the angular extent in each of the two axes by the angular articulation of the gimbal support, thereby temporally expanding the set of light directions along each of the two axes.

13. The directional light modulator of claim 1 being used as a display that can be switched to operate either in a 3D display mode or in a high resolution 2D display mode by adapting a format of input data to be commensurate with the desired mode.

14. The directional light modulator of claim 1 being used as a backlight for a liquid crystal display (LCD) that can be switched to operate either as a 3D display or as a high resolution 2D display.

15. The directional light modulator of claim 1 capable of modulating within its expanded angular extent a multiplicity of views with an angular resolution value commensurate with the human visual system eye angular separation, thus making it a 3D display that will not require the use of glasses to view the 3D content it displays.

16. The directional light modulator of claim 15 capable of modulating a 3D image with a sufficient angular resolution value between generated multiple views that will eliminate the vergence-accommodation conflict (VAC) which typically hinders the performance of 3D displays and causes visual fatigue.

17. The directional light modulator of claim 1 wherein light field modulation capabilities of the directional light modulator makes it the underlying basis of a 3D light field display that can be used to implement a synthetic holography 3D display.

18. A directional light modulator comprising:
   an emissive micro emitter array device comprising a multiplicity of individually addressable emissive pixels;
   a micro lens array aligned and physically bonded to the emissive micro emitter array device; and,
   a two axis gimbal having a bonding pad upon which the emissive micro emitter array device and the micro lens array assembly is physically and electrically bonded;
   the two axis gimbal having two sets of electromagnetic actuators aligned with the two axes of the gimbal to affect temporal angular articulation of said bonding pad around the two axes of the gimbal in an angular motion having a periodicity selected to enable temporal coverage of the maximum articulation angle within an image frame duration, and
   a set of electrical contacts connecting said bonding pad to a set of device interface contacts.

19. The directional light modulator of claim 18 wherein the two axis gimbal has a spherical pivot on the backside of the bonding pad and a matched spherical socket on a topside of a gimbal base.

20. The directional light modulator of claim 19 further comprising a mechanical resistance spring that defines the neutral position of the gimbal relative to a gimbal base, the mechanical resistance spring being provided by a set of four spiral shaped springs etched onto a spring layer bonded at its inner end at a backside of four corners of the bonding pad and at its outer end at a topside of the gimbal base.

21. The directional light modulator of claim 20 wherein electrical connections between the bonding pad and the set of device interface contacts are routed through the four spiral shaped springs.

22. The directional light modulator of claim 19 wherein the electromagnetic actuators are embedded in the spherical pivot and spherical socket.

23. The directional light modulator of claim 18 wherein the temporal angular articulation affected by the electromagnetic actuators has a maximum angular articulation value around each of the two axes of the gimbal.

24. The directional light modulator of claim 18 wherein the micro lens array is comprised of a plurality of micro lens arrays fabricated using ultraviolet imprint lithography at the wafer level to be precisely aligned relative to one another and relative to the multiplicity of pixels of the emissive micro emitter array device.

25. The directional light modulator of claim 18 wherein in the micro lens array, each of its constituent lenses is associated and precisely aligned with a respective plurality of pixels within a two dimensional array of pixel groups, with each constituent lens optically mapping the light emitted from the respective plurality of pixels into a corresponding discrete set of directions within an angular extent defined by a numerical aperture of the respective constituent lens.

26. The directional light modulator of claim 25 wherein each of the pixels within each of the pixel groups is individually addressable through the device interface contacts to enable the directional light modulator to generate light from each pixel that is modulated in color, intensity and direction.

27. The directional light modulator of claim 26 capable of generating a light field defined by the spatial coordinates within the two dimensional array of the pixel groups, a set of angular directional coordinates defined by the two dimensional array pixel group and the temporal values of the articulation.

28. The directional light modulator of claim 26 wherein the addressability of each pixel is accomplished using a multiple field data input to the directional light modulator whereby for each designated pixel group address within the spatial array of the pixel groups, at least one input data field is used to specify the direction of the emitted light and at least one field is used to specify the color and intensity of the light emitted in that designated direction.

29. The directional light modulator of claim 25 wherein the temporal angular articulation causes the directional light modulator to have an expanded angular extent that includes the angular extent of each pixel group plus twice the maximum angular articulation, with a corresponding number of expanded directions that is equal to the number of directions of each pixel group multiplied by the ratio of the expanded angular extent to the angular extent of each pixel group along each of the two articulation axes.

30. The directional light modulator of claim 18, used in plurality to form a tiled array of the directional light modulators having an expanded spatial aperture.

31. The directional light modulators of claim 30 wherein in the micro lens arrays, each of its constituent lenses is associated and precisely aligned with a respective plurality of pixels within a two dimensional array of pixel groups, with each constituent lens optically mapping the light emitted from the respective plurality of pixels into a corresponding discrete set of directions within an angular extent defined by a numerical aperture of the respective constituent lens, and further comprised of a collective set of the spatial arrays of the pixel groups whereby each pixel within each pixel group is individually addressable to generate light that is modulated in color, intensity and direction, thereby enabling the expanded spatial aperture directional light modulator device to generate spatially modulated light across a spatial aperture spanning the collective set of the spatial arrays that is also modulated in color, intensity and direction.

32. The directional light modulators of claim 31 wherein the spatial, direction, color and intensity modulation addressability of the expanded spatial aperture directional light modulator is accomplished using a multiple field data input to the individual directional light modulators whereby for each designated pixel group within the spatial array of the pixel groups, at least one input data field is used to specify the direction of the emitted light and at least one field is used to specify the color and intensity of the light emitted in that designated direction.

33. The directional light modulators of claim 30 being used as a display that can be switched to operate either in a 3D display mode or in a 2D display mode by adapting a format of input data to be commensurate with the desired mode.

34. The directional light modulators of claim 30 being used as a backlight for a liquid crystal display (LCD) to create either a 3D display or 2D display that can be switched to operate either as a 3D display or as a high resolution 2D display.

35. The directional light modulators of claim 30 capable of modulating within its expanded angular extent a multiplicity of views with an angular resolution value commensurate with the human visual system eye angular separation, thus making it a 3D display that will not require the use of glasses to view the 3D content it displays.

36. The directional light modulator of claim 35 capable of modulating a 3D image with sufficient angular resolution value between the generated multiple views that will eliminate the vergence-accommodation conflict (VAC) which typically hinders the performance of 3D displays and causes visual fatigue.

37. The directional light modulators of claim 30 wherein light field modulation capabilities of the directional light modulator makes them the underlying basis of a 3D light field display that can be used to implement a synthetic holography 3D display.

38. The directional light modulator of claim 18 being used as a display that can be switched to operate either in a 3D display mode or in a high resolution 2D display mode by adapting a format of input data to be commensurate with the desired mode.

39. The directional light modulator of claim 18 being used as a backlight for a liquid crystal display (LCD) to create either a 3D display or 2D display that can be switched to operate either as a 3D display or as a high resolution 2D display.

40. The directional light modulator of claim 18 capable of modulating within its expanded angular extent a multiplicity of views with an angular resolution value commensurate with the human visual system eye angular separation, thus making it a 3D display that will not require the use of glasses to view the 3D content it displays.

41. The directional light modulators of claim 40 capable of modulating a 3D image with sufficient angular resolution value between the generated multiple views that will eliminate the vergence-accommodation conflict (VAC) which typically hinders the performance of 3D displays and causes visual fatigue.

42. The directional light modulator of claim 18 wherein light field modulation capabilities of the directional light modulator makes it the underlying basis of a 3D light field display that can be used to implement a synthetic holography 3D display.

43. A directional light modulator comprising:
a two dimensional emissive micro emitter array device;
a micro lens array of micro lens elements;
the two dimensional emissive micro emitter array device and the micro lens array being assembled together and angularly articulated as a single assembly to emit light around two axes within a plane of an emissive surface of the emissive micro emitter array and within a range of plus and minus a maximum angular articulation in each respective axis;
the angular articulation being provided by a gimbal support for the assembly of the two dimensional emissive micro emitter array device and the micro lens array for temporally expanding the angular extent in each of the two axes by the angular articulation of the gimbal support, thereby temporally expanding the set of light directions along each of the two axes.

44. The directional light modulator of claim 43 wherein the two dimensional emissive micro emitter array comprises an array of pixels wherein each pixel is individually addressable, and wherein the individual addressability of the pixels within a respective pixel group together with the temporally expanded set of directions by the angular articulation of the gimbal support enables the individual pixel addressability within the temporally expanded set of directions, thereby enabling the directional light modulator to generate light that is directionally modulated in any of the directions comprising the temporally expanded set of light directions.

45. The directional light modulator of claim 44 wherein the two dimensional emissive micro emitter array comprises an array of pixels wherein each pixel is individually addressable, and wherein the individual pixel addressability includes individual pixel color and intensity modulation addressability, wherein the temporal association of the pixels within a pixel group with the temporally expanded set of light directions enables the modulation of the color and the intensity of the light emitted in each of the temporally expanded set of directions, thereby enabling the light modulator to generate light that is modulated in color, intensity and direction over the expanded angular extent.

46. The directional light modulator of claim 43 wherein the temporally expanded angular extent is temporally continuous or discrete and has a repetition rate that is proportional to and synchronized with an image input data frame rate, whereby the maximum angular articulation around each of the two axes determines the expanded angular extent of the directional light modulator, the angular coverage, shape and aspect ratio.

47. The directional light modulator of claim 46 wherein the angular articulation around each of the two axes is at least equal to the frame rate of the input image data multiplied by a factor that equals the ratio of the expanded angular extent to the angular extent along each respective axis.

48. The directional light modulator of claim 43 wherein the annular articulation causes any light direction within the increased set of light directions to be modulated during the time interval during which the light direction falls with the articulated angular extent.

49. The directional light modulator of claim 43 having a directional resolution which is the angular separation between the individual light directions within the temporally expanded set of light directions.

50. The directional light modulator of claim 43 wherein the angular articulation is selected to affect an increase in either the expanded angular extent or spatial resolution for a given value of angular resolution.

51. A directional light modulator comprising:
an emissive micro emitter array device comprising a multiplicity of pixels;
a micro lens array aligned and physically bonded to the emissive micro emitter array device; and,
a two axis gimbal having a bonding pad upon which the emissive micro emitter array device and the micro lens array assembly is physically and electrically bonded;
the two axis gimbal having two sets of electromagnetic actuators aligned with the two axes of the gimbal to affect temporal angular articulation of said bonding pad around the two axes of the gimbal, and
a set of electrical contacts connecting said bonding pad to a set of device interface contacts;
wherein in the micro lens array, each of its constituent lenses is associated and precisely aligned with a respective plurality of pixels within a two dimensional array of pixel groups, with each constituent lens optically mapping the light emitted from the respective plurality of pixels into a corresponding discrete set of directions within an angular extent defined by a numerical aperture of the respective constituent lens; and
wherein the temporal angular articulation causes the directional light modulator to have an expanded angular extent that includes the angular extent of each pixel group plus twice the maximum angular articulation, with a corresponding number of expanded directions that is equal to the number of directions of each pixel group multiplied by the ratio of the expanded angular extent to the angular extent of each pixel group along each of the two articulation axes.

52. The directional light modulator of claim 51 wherein the two axis gimbal is implemented using multiple silicon substrate layers to realize a two axis pivot of the gimbal and a mechanical resistance spring that defines the neutral position of the gimbal relative to a gimbal base.

53. The directional light modulator of claim 52 wherein the two axis pivot is realized by etching, using semiconductor lithography, of an inner ring and an outer ring around the periphery of the bonding pad and leaving two sets of silicon bridges connecting the rings along both axes.

54. The directional light modulator of claim 53 wherein the mechanical resistance spring comprises the two sets of silicon bridges.

55. The directional light modulator of claim 53 wherein electrical connections between the bonding pad and the set of device interface contacts are routed through the two sets of silicon bridges of the two axis pivot.

56. The directional light modulator of claim 53 wherein the electromagnetic actuators are bonded to a backside of the bonding pad and to a topside of a gimbal base layer of the multiple silicon substrate layers.

57. The directional light modulator of claim 52 wherein drive electrical signals to the electromagnetic actuators provide temporal angular articulation that is either temporally continuous or discrete and having a repetition rate that is proportional to and synchronized with an image input data frame rate provided through the device interface contacts, and wherein the drive electrical signals include correction values provided by a set of sensors bonded to a backside of the contact pad and a topside of a base layer of the gimbal.

58. The directional light modulator of claim 51 having a spatial resolution that is determined by the number of pixel groups along each axis of the two dimensional array of pixel groups and having a directional resolution that is determined by the number of individual light directions within the expanded angular extent.

59. The directional light modulator of claim 51 having an angular or directional resolution that is defined as the angular separation between the individual light directions within the temporally expanded set of light directions and determined by the fractional value of the angular extent being addressed by each one pixel within a pixel group.

60. The directional light modulator of claim 59 wherein the maximum angular articulation is selected to affect an increase in either the expanded angular extent or the spatial resolution for a given value of the angular resolution.

61. The directional light modulator of claim 59 wherein each of the constituent lenses of the micro lens array is comprised of at least one lens element having at least one refracting surface whereby the number of lens elements and the number of their associated refracting surfaces determines the angular extent and affects the value of the expanded angular extent and the angular resolution.

62. The directional light modulator of claim 59 having a spatial resolution that is determined by the number of pixel groups along each axis of the two dimensional array of pixel groups and having a directional resolution that is determined by the number of individual light directions within the expanded angular extent, wherein the temporal angular articulation has a maximum angular articulation value around each of the two axes of the gimbal, the spatial resolution and the directional resolution of the directional light modulator being determined by the size of the pixel group, the directional resolution and pixel pitch of the emissive micro emitter array, the lens pitch of the micro lens array, the angular extent and a maximum articulation angle.

* * * * *